United States Patent [19]

Kielma et al.

[11] 4,427,325

[45] Jan. 24, 1984

[54] MULTIPLE SPINDLE TOOLHEAD

[75] Inventors: Ervin J. Kielma, West Allis; Albin J. Schabowski, Milwaukee; John T. Currer, Wauwatosa, all of Wis.

[73] Assignee: Kearney & Trecker Corporation, West Allis, Wis.

[21] Appl. No.: 249,746

[22] Filed: Apr. 1, 1981

Related U.S. Application Data

[62] Division of Ser. No. 954,438, Oct. 25, 1978, Pat. No. 4,288,909.

[51] Int. Cl.³ .................. B23B 39/16; B23C 5/26; B23Q 3/157
[52] U.S. Cl. .................. 409/144; 29/568; 408/53; 409/230
[58] Field of Search ............... 29/26 A, 568; 409/144, 409/215, 233, 230; 408/46, 53; 279/8

[56] References Cited

U.S. PATENT DOCUMENTS

| | | | |
|---|---|---|---|
| 3,311,024 | 3/1967 | Daugherty | 409/233 |
| 3,794,436 | 2/1974 | Rowlett | 408/46 X |
| 3,849,018 | 11/1974 | Anderson | 408/46 |
| 3,930,301 | 1/1976 | Wagner | 29/568 |
| 4,012,818 | 3/1977 | Dornbluth et al. | 29/26 A |

FOREIGN PATENT DOCUMENTS 2616550 10/1977 Fed. Rep. of Germany ........ 408/46

OTHER PUBLICATIONS

"Convertible Multi Spindle Boring Heads for Numerically Controlled Machining Centers" Wekstattstechnik vol. 66, No. 4, 1976, pp. 197-178, D. Maier.
"Multi Spindle Boring Heads for Machining Centers" Werkstattstechnik vol. 63, No. 10, 1973, p. 628.
"Automatic Tool Changer for Boring Tools", F.Krempel Werkstatt und Betrieb, vol. 110, No. 1, 1977.

Primary Examiner—Z. R. Bilinsky
Attorney, Agent, or Firm—Quarles & Brady

[57] ABSTRACT

An improved multiple spindle toolhead for a machine tool includes a body having at least one tool-carrying spindle journaled into one side thereof and having an input shaft coupled to the spindle and extending from the body side opposite to the spindle for seating in the machine tool spindle. A plurality of threaded studs extends rearwardly from the body for mating engagement with a plurality of threaded elements seated in the machine tool adjacent to the spindle. Means are provided in the machine tool for rotatably driving the threaded elements relative to the threaded studs on the toolhead body to secure the toolhead against the machine tool.

2 Claims, 40 Drawing Figures

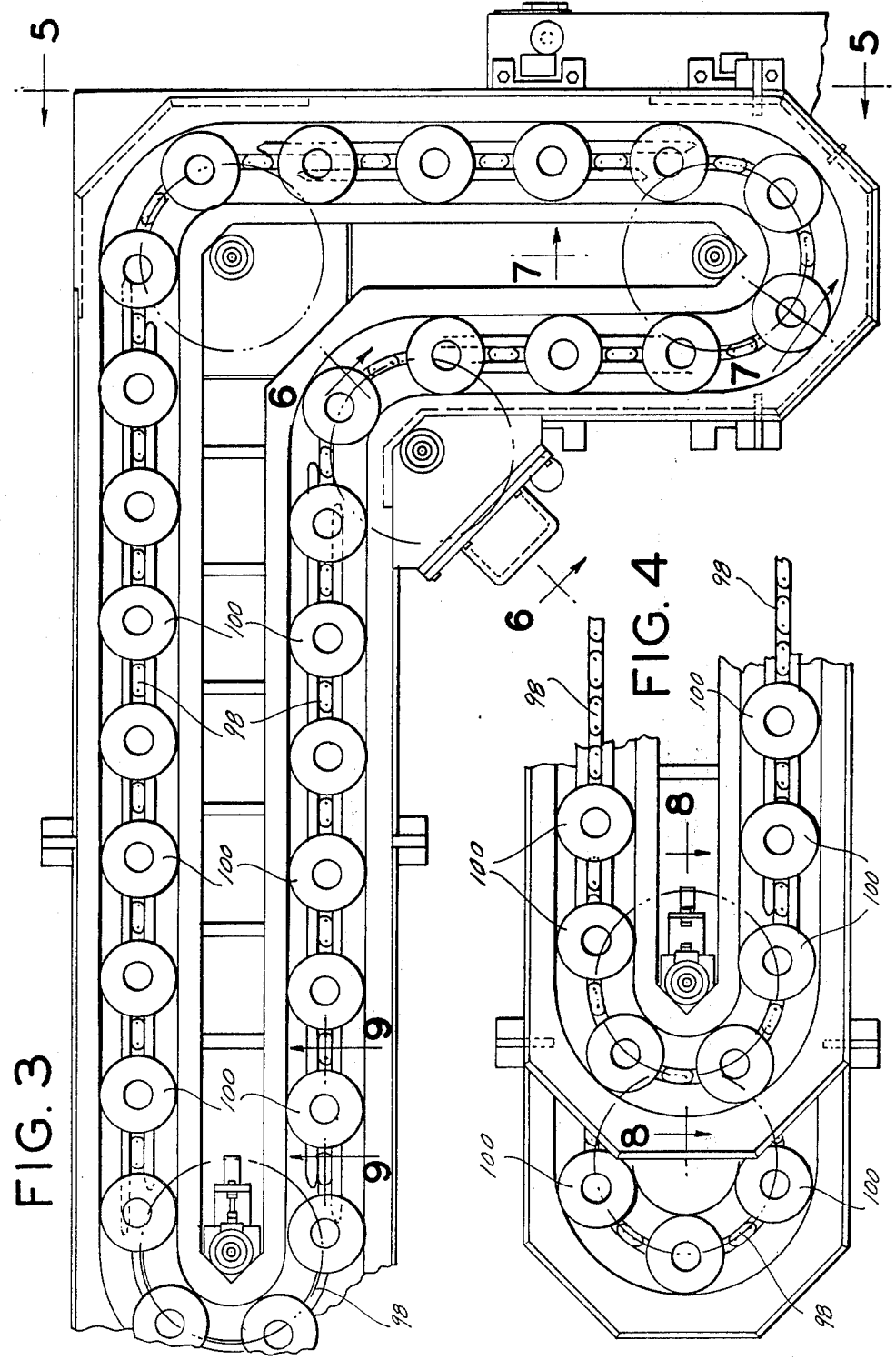

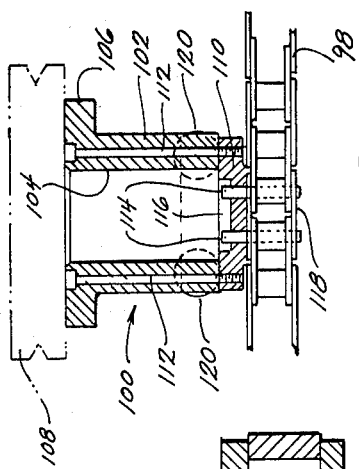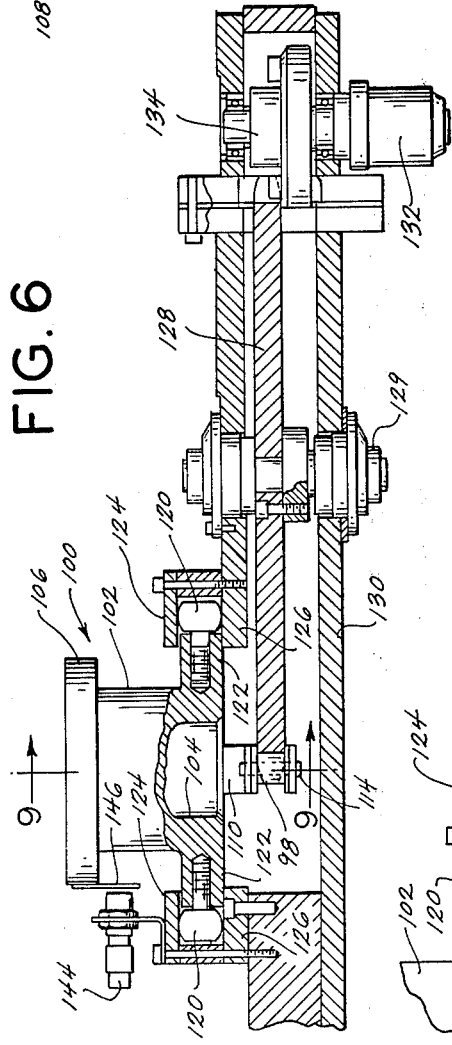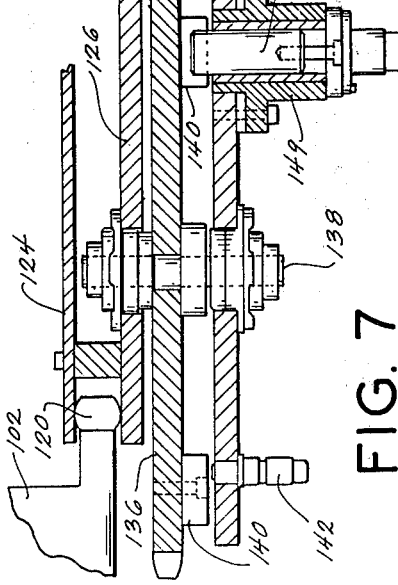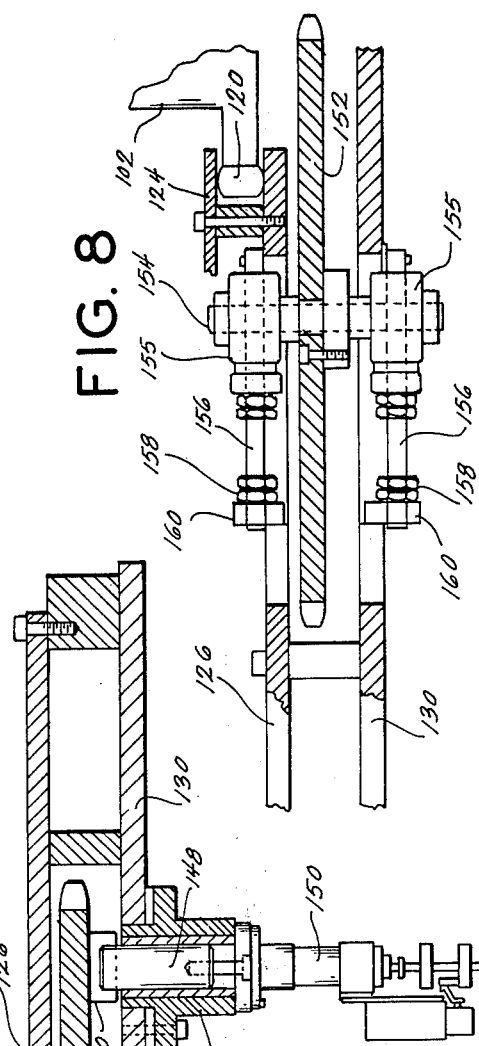

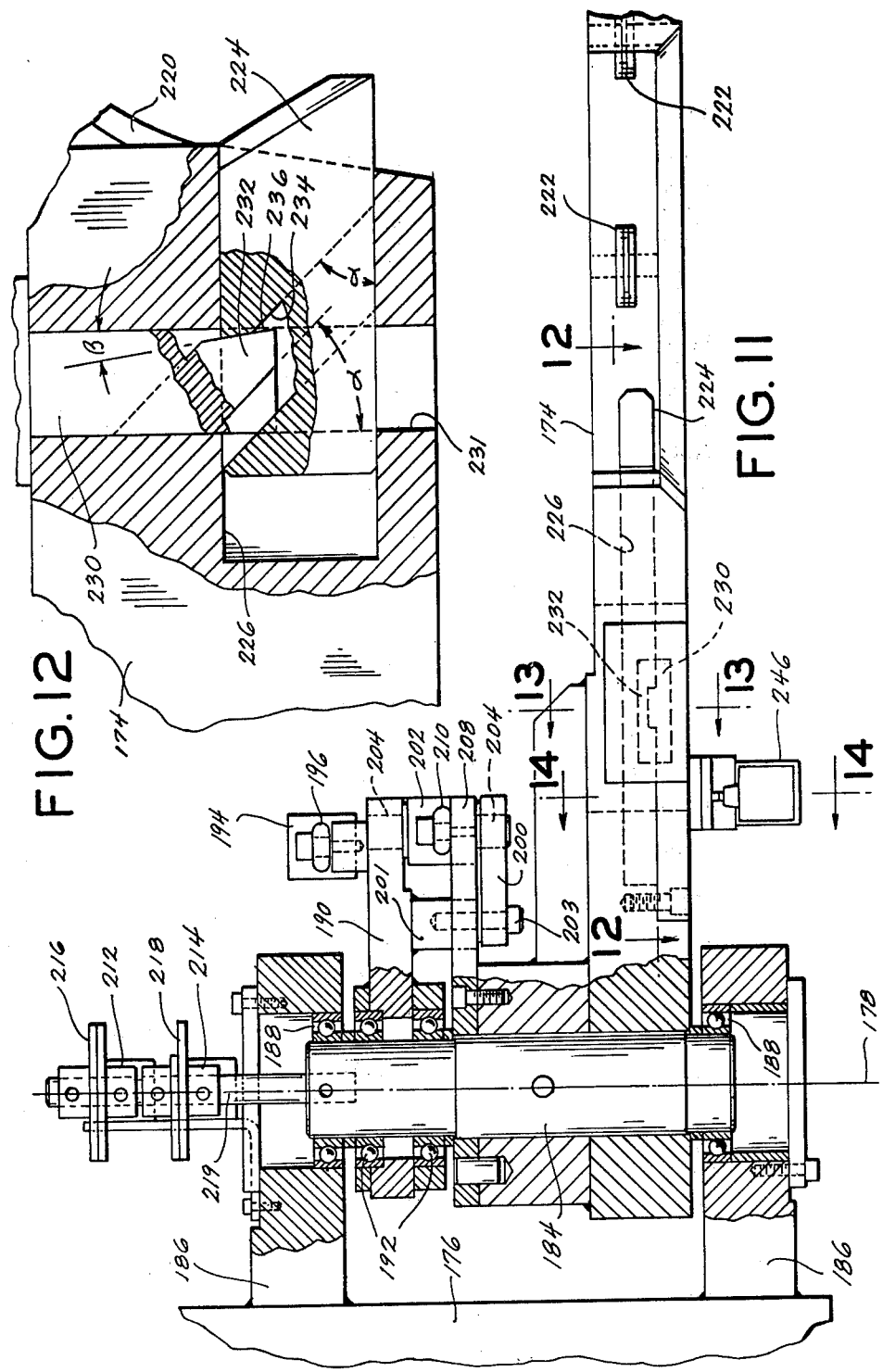

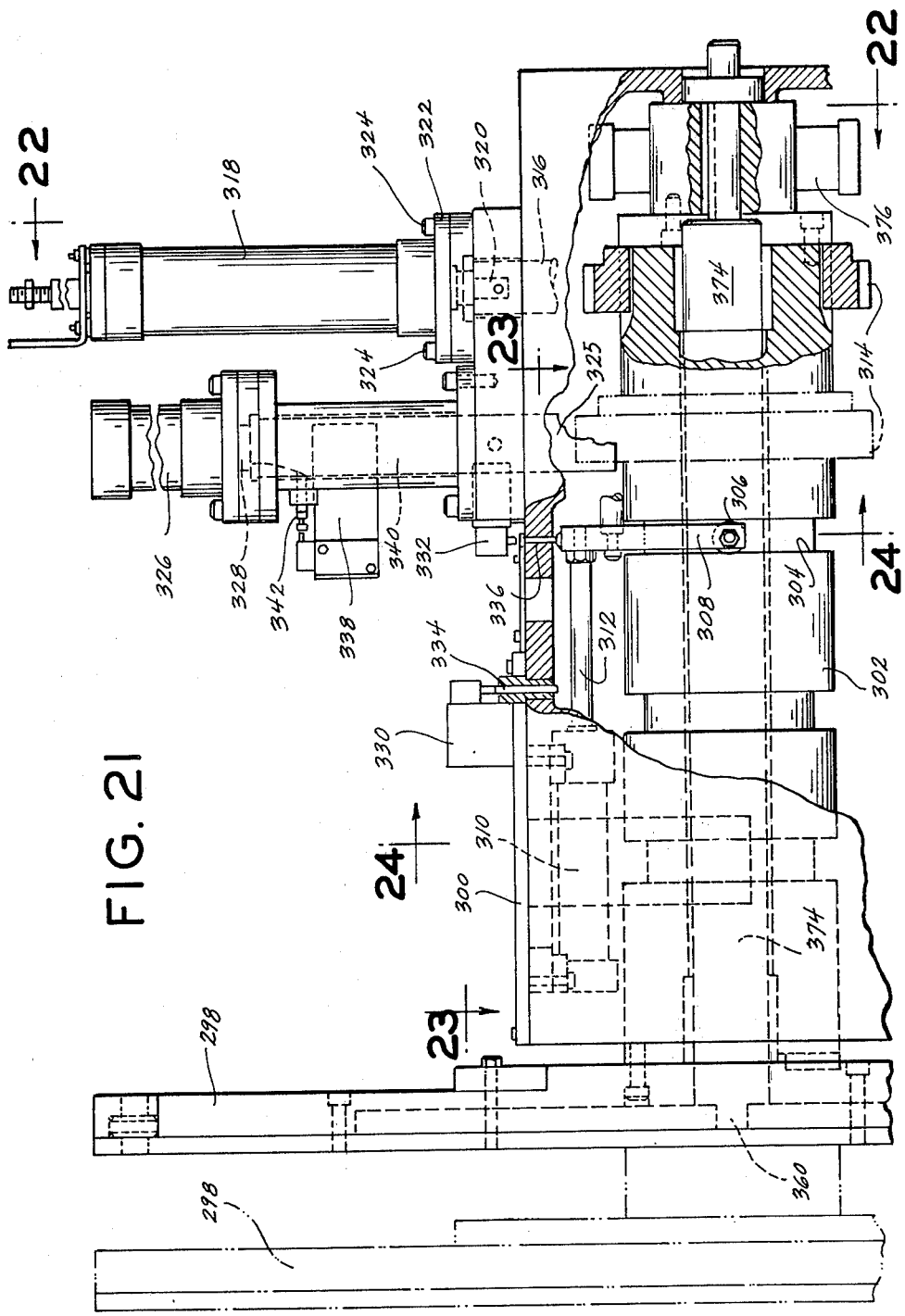

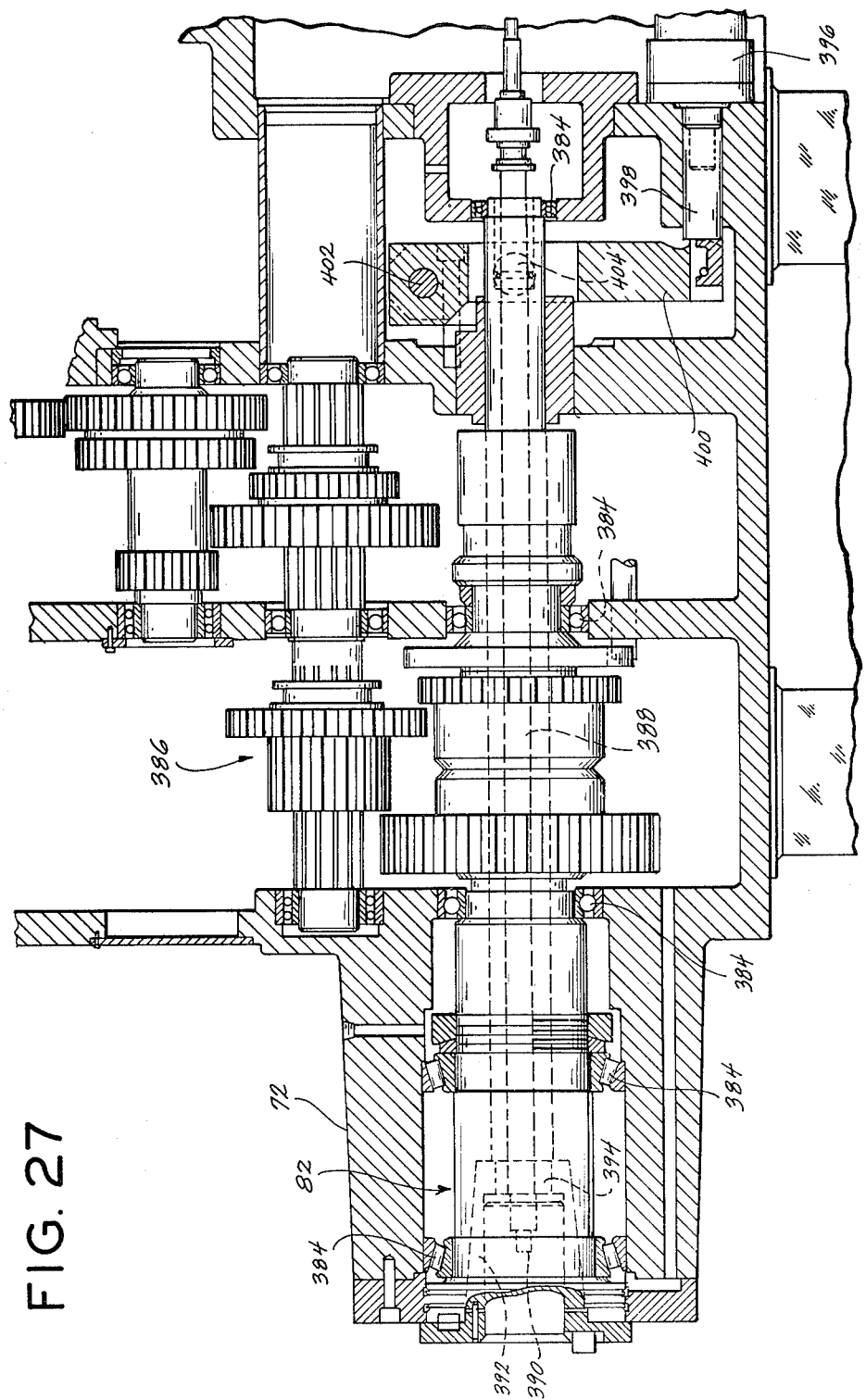

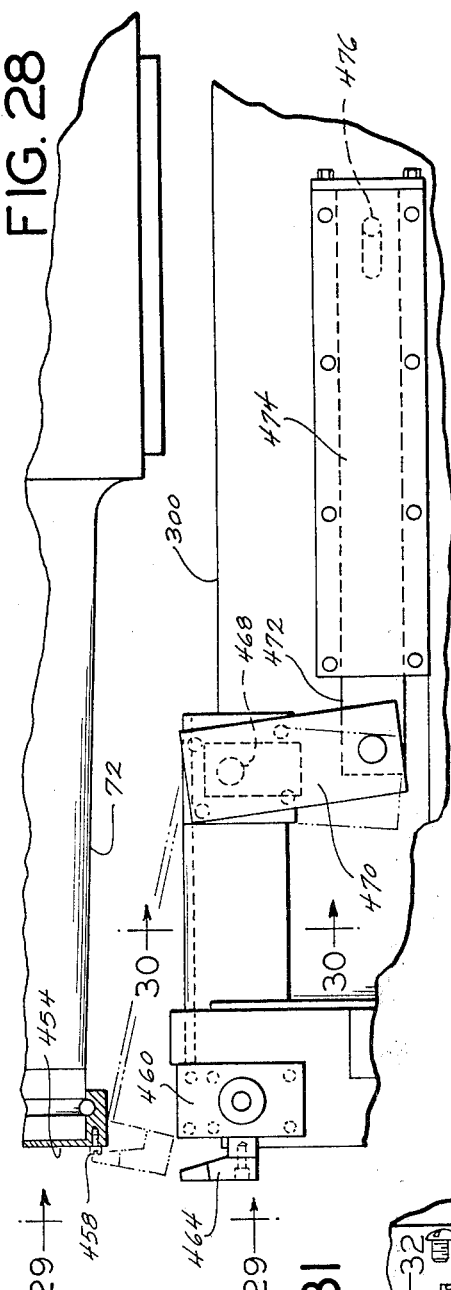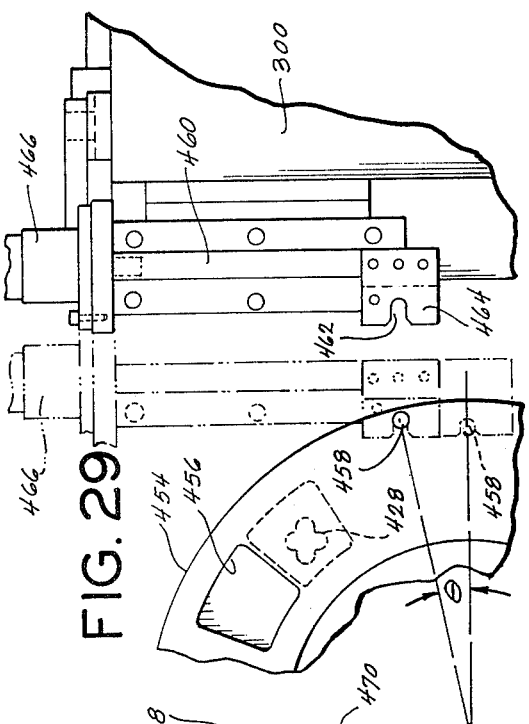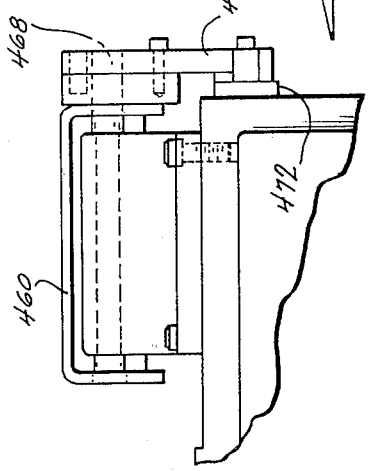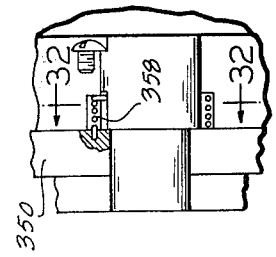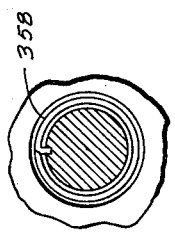

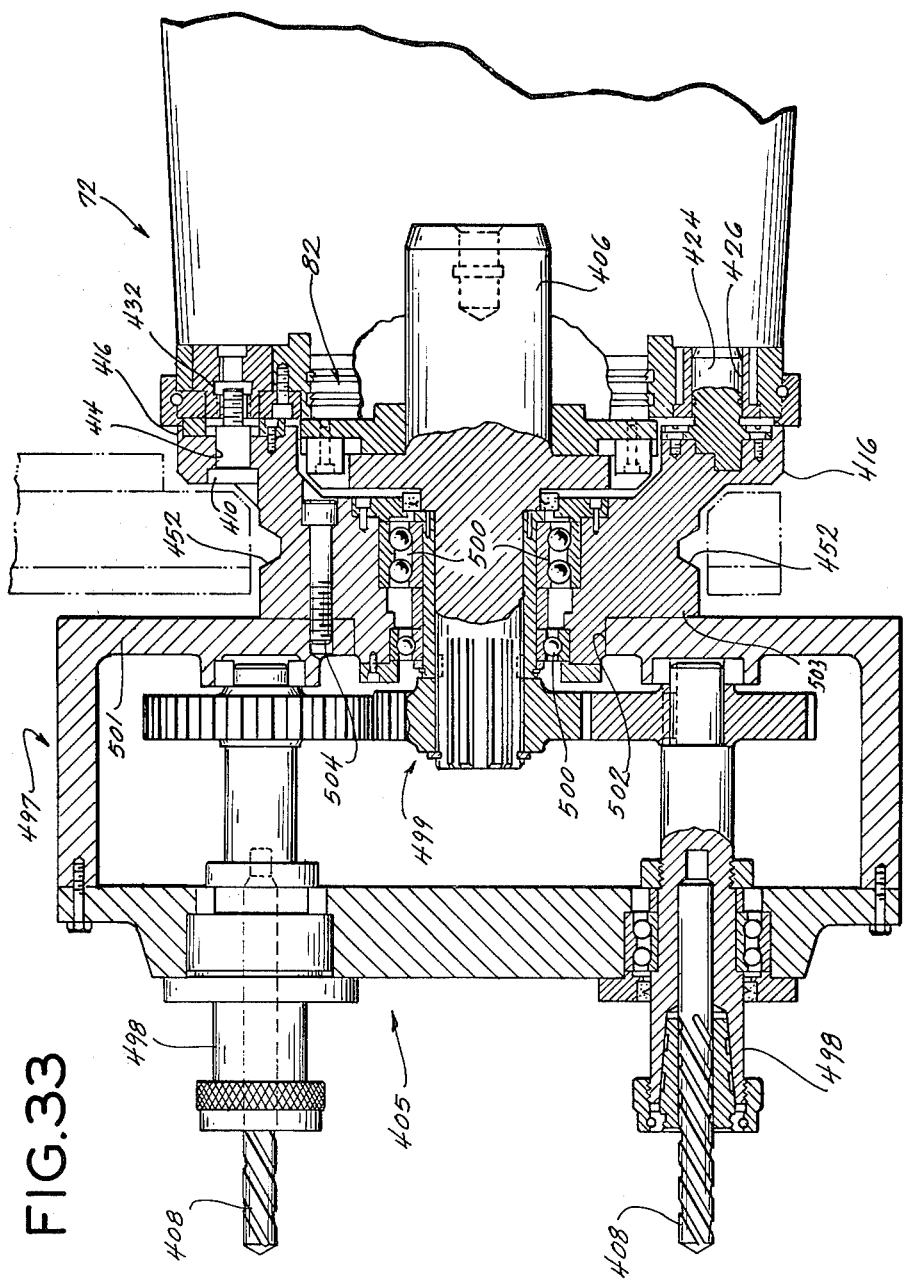

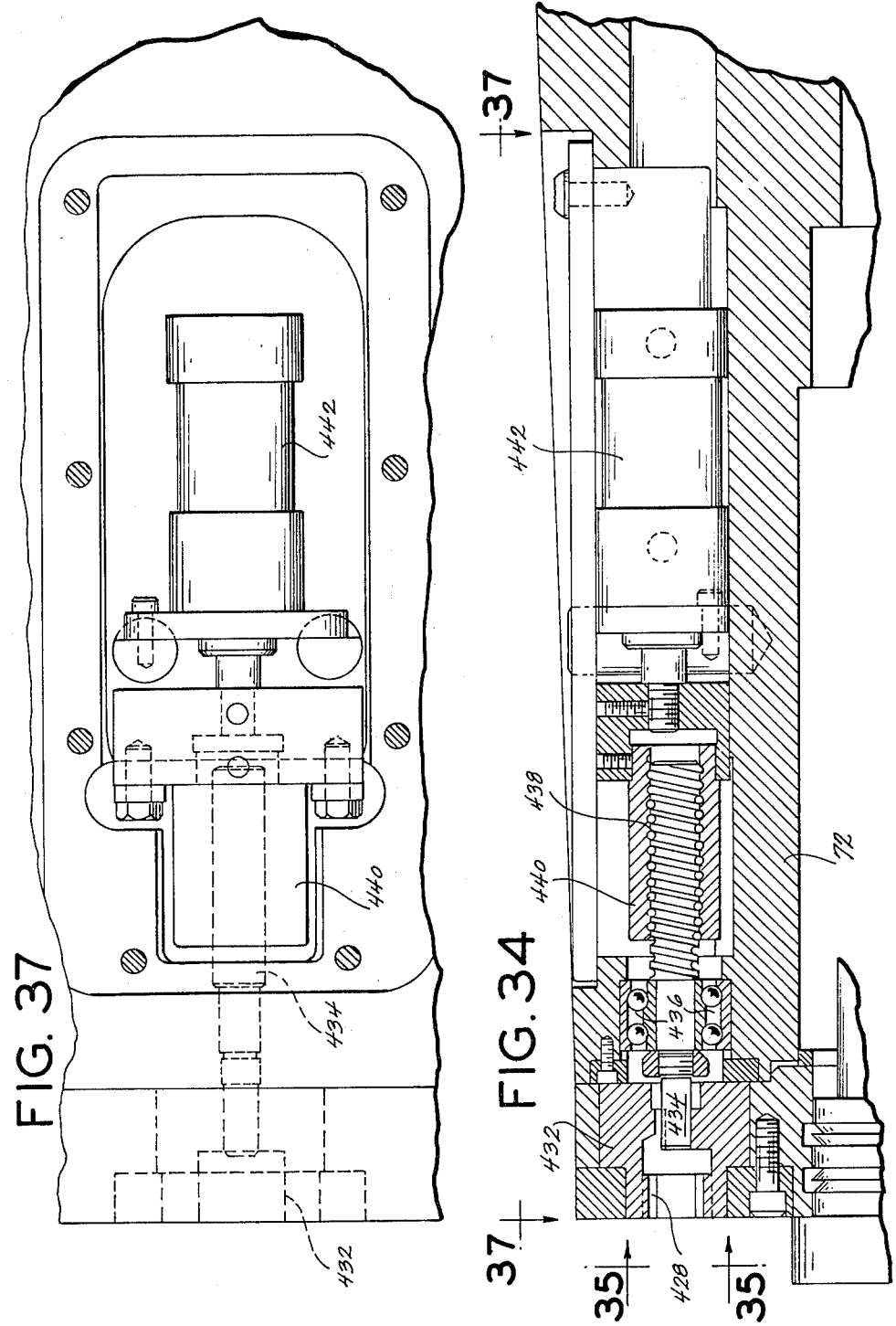

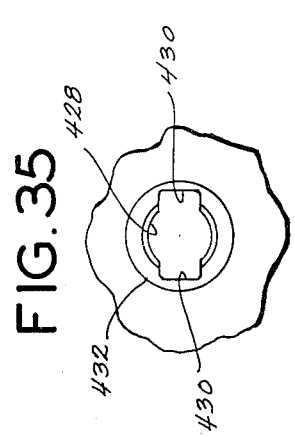
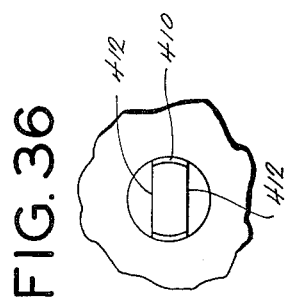
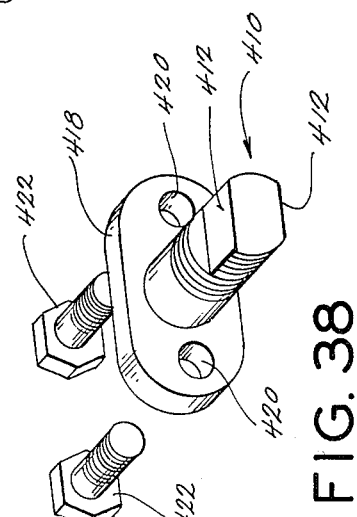
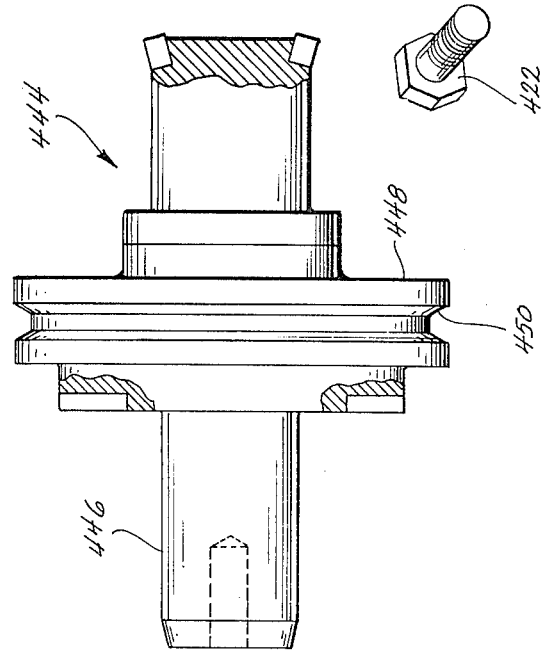

MULTIPLE SPINDLE TOOLHEAD

BACKGROUND OF THE INVENTION

This application is a divisional application of U.S. patent application, Ser. No. 954,438 filed on Oct. 25, 1978 now U.S. Pat. No. 4,288,909 issued Sept. 15, 1981 by Ervin J. Kielma et. al. for an AUTOMATIC TOOL CHANGER FOR A MACHINE TOOL.

This invention relates to automatic tool changers for machine tools.

In the past, many different types of automatic tool changers have been built, including some tool changers which are adapted to handle either single tools or small multiple spindle toolheads, but not large multiple spindle toolheads. The principal object of this invention is to provide an automatic tool changer which is capable of handling single tools and/or relatively large multiple spindle toolheads, e.g. toolheads that weight as much as 1,000 pounds. Another object of the invention is to provide a novel multiple spindle toolhead which can be handled by an automatic tool changer that is adapted to handle single tools. Other objects and advantages of the invention will be apparent from the detailed description herein.

SUMMARY OF THE INVENTION

An improved multiple spindle toolhead for use on an automatic tool changing machining center comprises a body having an input shank journaled into the back of the body and extending therebeyond for sealing in the machine tool spindle. At least one tool carrying spindle is journaled into the body and is coupled to the input shank by means of gears or the like. To secure the body to the spindlehead of the machine tool during a machining operation is a plurality of threaded studs are fastened to a flange which is fastened to circumscribe the input shank. The flange has a groove therein so as to permit engagement with the tool gripper arm of an automatic tool changer. Each of the threaded studs extending from the flange is dimensioned complementary to a corresponding one of plurality of threaded collars located in the machine tool adjacent to the spindle. In practice, a portion of each threaded stud and a portion of each threaded collar is recessed so that when the toolholder is inserted in the spindle, the threads on each threaded stud are in juxtaposition with the threads of a corresponding threaded collar, permitting the threads on each stud to engage the threads on each threaded collar when each collar is rotated relative to each stud.

DESCRIPTION OF THE DRAWINGS

FIG. 3 is a plan view of the tool storage magazine;

FIG. 4 is a fragmentary plan view of one end of the tool storage magazine;

FIG. 6 is a cross sectional view taken on the line 6—6 of FIG. 3;

FIG. 7 is a cross sectional view taken on the line 7—7 of FIG. 3;

FIG. 8 is a longitudinal sectional view taken on the line 8—8 of FIG. 4;

FIG. 9 is a cross sectional view of a tool socket taken on the line 9—9 of FIG. 3;

FIG. 11 is a radial sectional view taken on the line 11—11 of FIG. 10;

FIG. 12 is a fragmentary longitudinal sectional view taken on the line 12—12 of FIG. 11;

FIG. 21 is a fragmentary plan view, partially cut away, of the tool change arm which transfers tools and toolheads between the tilt unit and the spindle of the machining center;

FIG. 27 is an axial sectional view of the spindle;

FIG. 28 is a fragmentary plan view of the tool change housing adjacent to the spindle of the machine tool;

FIG. 29 is a fragmentary front elevational view taken on the line 29—29 of FIG. 28;

FIG. 30 is a cross sectional view taken on the line 30—30 of FIG. 28;

FIG. 31 is a fragmentary longitudinal sectional view taken on the line 31—31 of FIG. 25;

FIG. 32 is a fragmentary cross sectional view taken on the line 32—32 of FIG. 31;

FIG. 33 is a longitudinal sectional view of a multiple spindle toolhead mounted in the machine tool spindle;

FIG. 34 is a longitudinal sectional view of the support and clamp means on the spindlehead for clamping a toolhead thereto and for supporting the toolhead;

FIG. 35 is a fragmentary front elevational view taken on the line 35—35 of FIG. 34;

FIG. 36 is an end view of a threaded stud which projects from the rear of the multiple spindle toolhead shown in FIG. 33;

FIG. 37 is a fragmentary plan view taken on the line 37—37 of FIG. 34;

FIG. 38 is an exploded perspective view of one of the studs which form part of the clamp and support means for the multiple spindle toolhead;

FIG. 39 is a side elevational view of a boring bar adapted to be used in the machine tool and automatic tool changer of this invention.

DETAILED DESCRIPTION OF THE INVENTION

Figure 1:
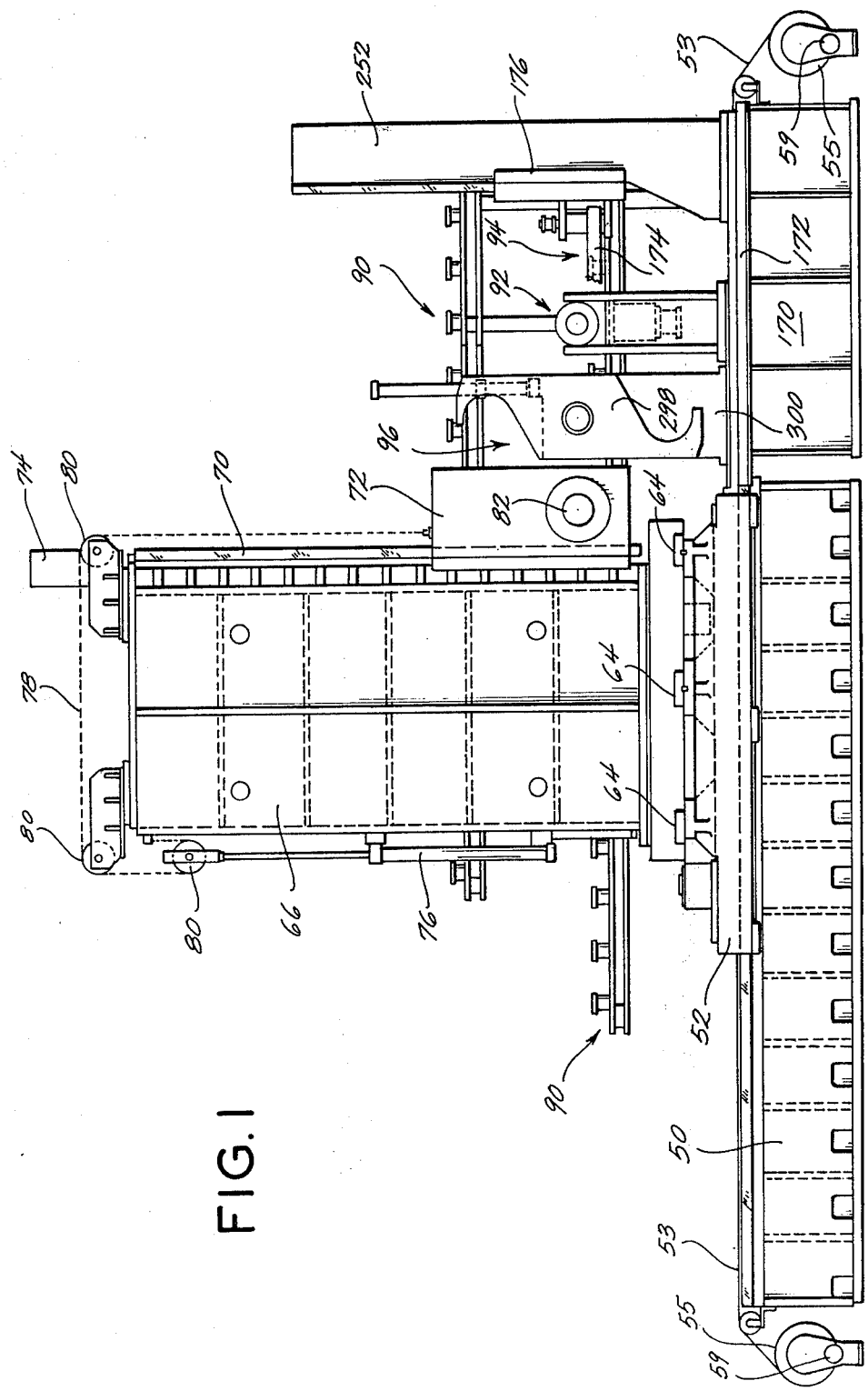
FIG. 1 is a front elevational view of a horizontal machining center which utilizes an automatic tool changer of this invention.
Figure 2:
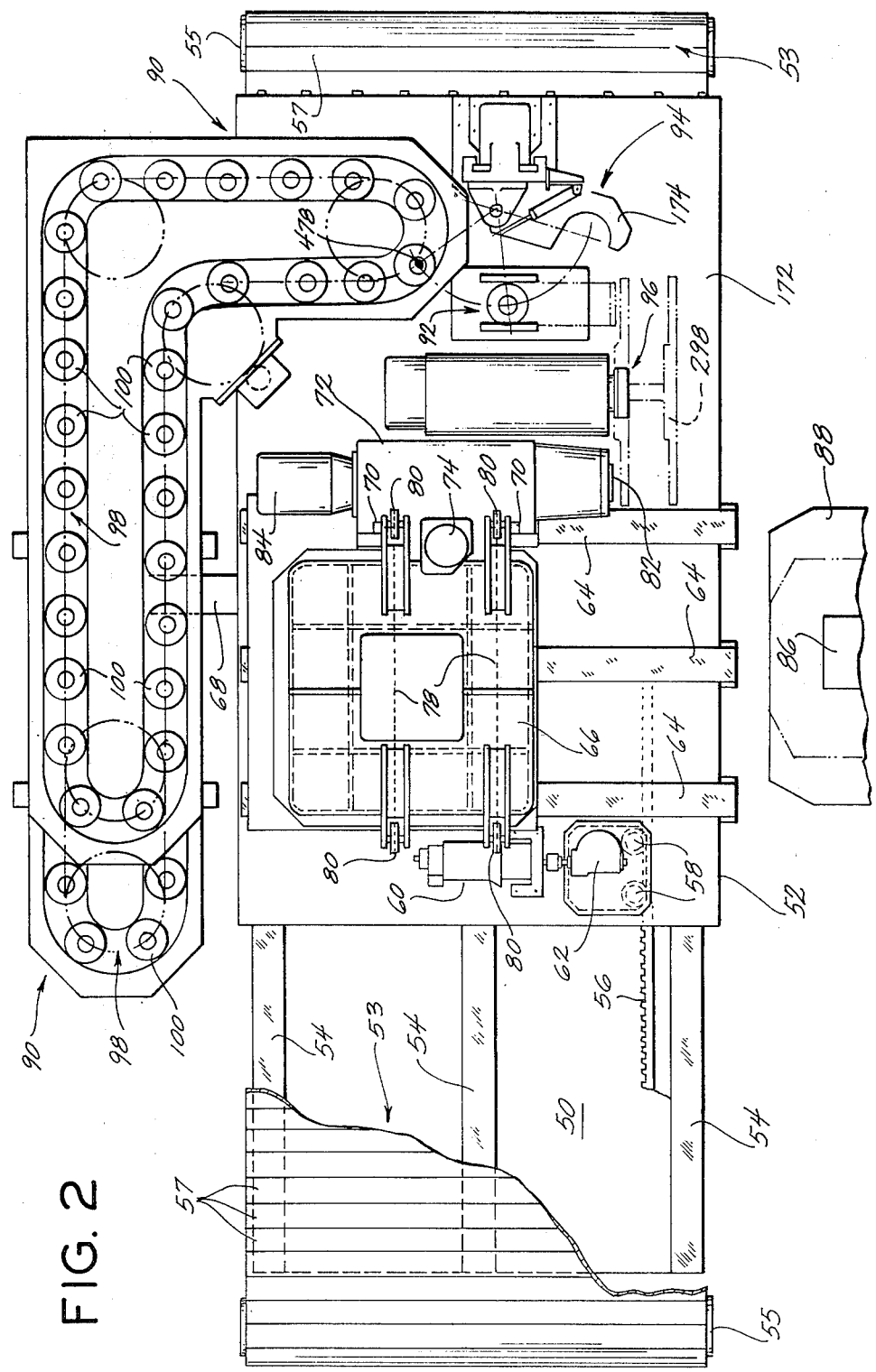
FIG. 2 is a plan view of the machining center of FIG. 1.

FIG. 1 is a front elevational view and FIG. 2 is a plan view of a horizontal machining center which is equipped with an automatic tool changer of this invention. The machining center includes a bed 50 upon which a saddle 52 is slidably mounted on X-axis ways 54 (FIG. 2). Saddle 52 is driven along ways 54 by a rack and pinion drive which consists of a rack 56 (FIG. 2) on bed 50 and two pinions 58 on saddle 52 which are driven by a servo motor 60 through a conventional speed reduction gear box 62. Motor 60 is selectively energized by a conventional numerically controlled X-axis servo system (not shown) to move saddle 52 to any desired position along the X-axis.

A pair of flexible metallic cover sheets 53 are coupled between opposite side edges of saddle 52 and a corresponding pair of storage rollers 55 which are mounted on opposite ends of bed 50. Cover sheets 53 are both made of relatively narrow interlocked metal slats 57 (FIG. 2) and easily roll up on their respective rollers 55. Both rollers 55 are torsion biased away from saddle 52 by motors 59 (FIG. 1) and maintain a tension in cover sheets 53 at all times so that each cover sheet 53 will roll up automatically when saddle 52 moves toward it while the opposing cover sheet 53 will be drawn off its roller 55 against the force of the corresponding motor 59. Cover sheets 53 protect the portions of X-axis ways 54 that are not covered by saddle 52.

A set of Z-axis ways 64 are formed on top of saddle 52 perpendicular to X-axis rays 54. An upright 66 is slidably mounted on Z-axis ways 64 and is driven there along by a conventional ballscrew drive (not shown) which is powered by a servo motor 68 (FIG. 2). Motor 68 is selectively energized by a conventional numerically controlled Z-axis servo system (not shown) to move upright 66 to any desired position along the Z-axis.

A set of vertical Y-axis ways 70 are formed on upright 66 perpendicular to both X-axis ways 54 and Z-axis ways 64. A spindlehead 72 is slidably mounted on Y-axis ways 70 and is driven there along by a conventional ballscrew drive (not shown) which is powered by a servo motor 74 (FIG. 2). Motor 74 is selectively energized by a conventional numerically controlled Y-axis servo system (not shown) to move spindlehead 72 to any desired position along the Y-axis.

A hydraulically actuated counterweight system is coupled to spindlehead 72 to take the weight of spindlehead 72 off the ballscrew drive therefor. The counterweight system includes two hydraulic piston and cylinder mechanisms 76 (FIG. 1), two cables 78 which are coupled between hydraulic cylinder mechanisms 76 and spindlehead 72, and pulleys 80 which guide cables 78. Hydraulic piston and cylinder mechanisms 76 apply a tension to cables 78 which is approximately equal and opposite to the weight of spindlehead 72 to take the weight of spindlehead 72 off the ballscrew drive.

A spindle 82 is rotatably mounted in spindlehead 72 and is adapted to receive conventional cylindrical shank toolholders and to clamp the toolholders to spindle 82 for rotation therewith. Spindle 82 is driven in its rotary motion by a spindle motor 84 (FIG. 2) through a set of conventional speed change gears (FIG. 27). Motor 84 is selectively energized by a conventional numerically controlled spindle motor control (FIG. 40) to rotate spindle 82 at the desired speed in the desired direction to machine a workpiece 86 (FIG. 2) on a conventional worktable 88 positioned in front of bed 50. The details of worktable 88 are omitted since they are not relevant to the automatic tool changer of this invention.

The automatic tool changer includes (1) a double deck tool storage magazine 90 which is adapted to store a plurality of single tools and/or multiple spindle toolheads with the shanks thereof in a vertical position, (2) a tilt unit 92 which is adapted to hold one toolhead and to tilt the tool or toolhead by 90° from a vertical position to a horizontal position parallel to the axis of spindle 82 or from a horizontal position to a vertical position, (3) a first tool change arm assembly 94 which is adapted to transfer tools and toolheads between tool storage magazine 90 and tilt unit 92, (4) a second tool change arm assembly 96 which is adapted to transfer tools and toolheads between tilt unit is adapted to transfer tools and toolheads between tilt unit 92 and spindle 82, (5) coacting clamp and support means, described hereinafter, for supporting each multiple spindle toolhead and holding it stationary while the shank and tools thereof are rotating with spindle 82, and (6) the hydraulic and electrical controls, described hereinafter, required to move the movable portions of components (1) to (5) above in accordance with a predetermined sequence, described hereinafter, for transferring tools and/or toolheads from tool storage magazine 90 to spindle 82 and vice versa.

The individual components of the automatic tool changer will be described in detail starting with tool storage magazine 90. Tool storage magazine 90 is a double deck structure which supports two endless chains 98 (FIG. 2) of tool and/or toolhead sockets 100. Referring to FIG. 9, each tool socket 100 has a hollow cylindrical body 102 which has a central bore 104 which is of a size to receive relatively large single tools with cylindrical shank toolholders or relatively large multiple spindle toolheads with cylindrical shanks. A flange 106 is formed on the top of body 102 for supporting the flange 108 on a toolholder or toolhead whose shank is inserted in bore 104.

Tool socket body 102 is bolted to a carrier 110 by bolts 112. Carrier 110 is fastened to chain 98 by a pair of support pins 114 which are fastened together on their top end by end piece 116 and extend through adjacent openings in the links of chain 98. A snap fastener 118 engages the bottom of pins 114 and secures them to chain 98.

At the bottom of tool socket body 102, three rollers 120 (FIG. 6) are journaled to flanges 122 with two rollers 120 on the outer side of socket body 102 (to the right in FIG. 6) and one roller in the inner side (to the left in FIG. 6). Rollers 120 ride in covered channels formed by spaced plates 124 and 126 which are fastened together by conventional means and are supported by conventional means.

Referring to FIG. 3, both endless chains 98 are guided and driven around a double L-shaped path by means of conventional sprockets, one of which is shown in FIG. 6, and another of which is shown in FIG. 7. Sprocket 128 in FIG. 6 is journaled for rotation on a vertical axle 129 between two spaced support plates 126 and 130 by conventional means and is driven by a servo motor 132 which is also attached to plates 126 and 130 by conventional means. Servo motor 132 drives a pinion 134 which is meshed with drive sprocket 128.

Sprocket 136 in FIG. 7 is an idler sprocket which is journaled for rotation on a vertical axle 138 between spaced support plates 126 and 130.

On the bottom of sprocket 136 (FIG. 7), a plurality of radially spaced stop lugs 140 are bolted thereto as a means of counting and locating the tool sockets 100. Stop lugs 140 are spaced apart from each other by the radial angle that separates tool sockets 100. A first proximity switch 142 is mounted on plate 130 and produces an output signal whenever one of the lugs 140 passes over it. A second proximity switch 144 (FIG. 6) is clamped to plate 124 in position to coact with a downwardly projecting tab 146 on one of the tool sockets 100.

Proximity switches 142 and 144 keep track of which tool socket 100 is in position to transfer or receive a tool. The tool sockets 100 in the upper deck of this embodiment of the invention are numbered from 1 to 29. When there is an output signal from both proximity switches 142 and 144, tool socket number 1 is in position to transfer or receive a tool. Each subsequent output signal from proximity switch 142 means that the next tool socket 100 in the sequence is in position to transfer a tool.

When the desired tool socket 100 is in position, motor 132 (FIG. 6) is de-energized and chain 98 coasts to a stop. A precision locating stud 148 (FIG. 7) is then raised by a hydraulic piston and cylinder mechanism 150 into position to engage the nearest lug 140. Motor 132 is then energized in the reverse direction to back sprocket 136 up until lug 140 and locating stud 148 abut against each other as shown in FIG. 7 which locates the desired tool socket 100 in position to transfer or receive a tool. Locating stud 148 is slidably mounted in a housing 149 and is moved by hydraulic piston and cylinder mechanism 150 between an upper position, shown in FIG. 7, and in which stud 148 abuts against the adjacent stop lug 140, and a lower position, in which stud 148 clears stop lugs 140. Stud 148 is moved to its lower position before motor 132 is energized in the forward direction to move a different tool socket 100 into the tool transfer position.

The tension in chain 98 is adjusted by an adjustable idler sprocket 152 (FIG. 8) which is journaled on a vertical axle 154 in bearing housings 155 which are slidably mounted on plates 126 and 130 by conventional means. A pair of threaded studs 156 carrying adjustment stop nuts 158 are screwed into threaded openings in housings 155. Stop nuts 158 abut against slotted lugs 160 on plates 126 and 130. The tension in chain 98 can be adjusted by loosening or tightening nuts 158.

Figure 5:
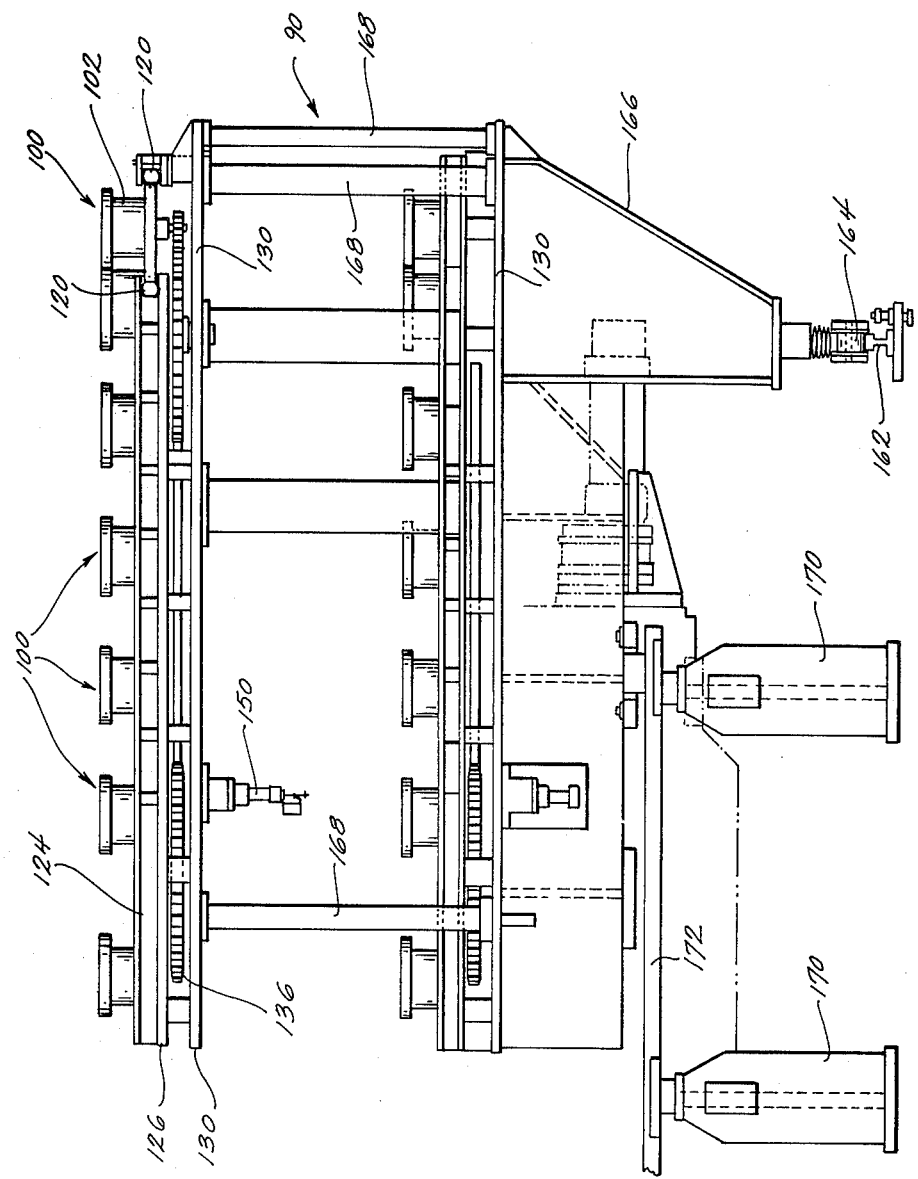
FIG. 5 is a side elevational view taken on the line 5—5 of FIG. 3.

FIG. 5 shows the supporting structure for tool storage magazine 90. The rear portion of tool storage magazine 90 (at the right side of FIG. 5) is rollably supported on a stationary rail 162 by rollers 164 which are journaled to a base 166. Base 166 is attached to the lower plate 130 of the lower deck of tool storage magazine 90. A group of spaced posts 168 extend between the lower plate 130 of the lower deck and the lower plate 130 of the upper deck of tool storage magazine 90. The front portion of tool storage magazine 90 (at the left side of FIG. 5) is slidably supported on bases 170 which extend from the adjacent portion of X-axis bed 50 (FIG. 1). A base plate 172 is attached to the adjacent end of the saddle 52 and slides over bases 170. The front portion of tool magazine 90 is supported by base plate 172 and thus moves with saddle 52 over the X-axis bed 50 and bases 170. Base plate 172 also supports tool change arms 94 and 96 and tilt unit 92 (see FIG. 2). Thus upright 66, tool storage magazine 90, tool change arms 94 and 96 and tilt unit 92 all move as a unit with saddle 52.

Figure 10:
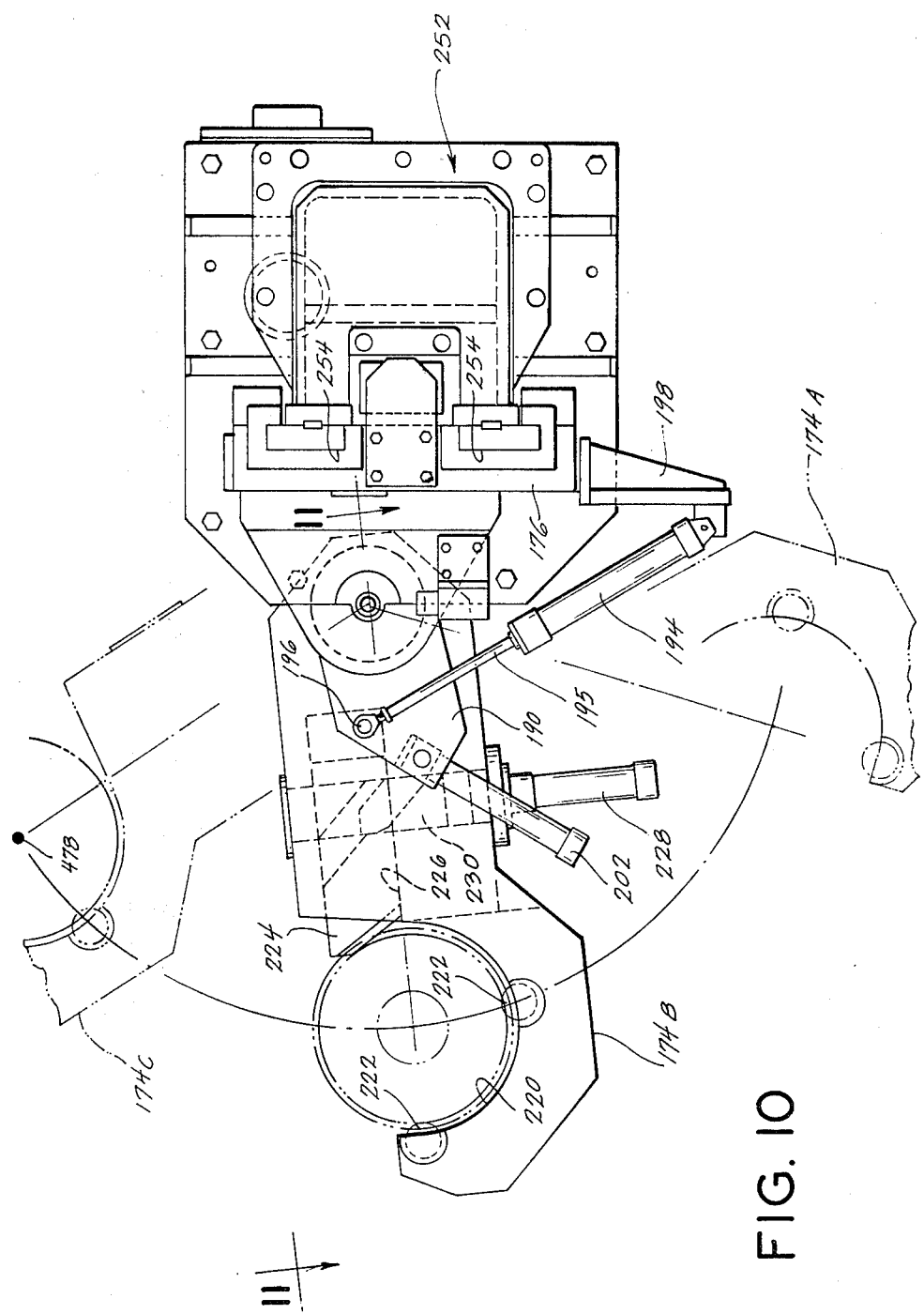
FIG. 10 is a plan view of the tool change arm which transfers tools and toolheads from the tool storage magazine to the tilt unit and vice versa.

Referring to FIG. 2, a first tool change arm assembly 94 transfers tools from tool storage magazine 90 to tilt unit 92. The details of the first tool change arm assembly 94 are illustrated in FIGS. 10–17. Referring to FIGS. 10 and 11, a tool gripper arm 174 is rotatably mounted on a base 176 for rotation about a vertical axis 178 (FIG. 11). Tool gripper arm 174 is rotatable from a forward position, indicated in FIG. 10 by broken outline 174A, to a central position indicated in FIG. 10 by the solid outline 174B, to a rear position indicated in FIG. 10 by broken outline 174C. In the rear position, tool gripper arm 174 picks up a tool or toolhead from tool storage magazine 90. In the central position, the tool or toolhead is placed in tilt unit 92. In the forward position, tool gripper arm 174 is clear of tilt unit 92 so that the latter can tilt forward. On the return portion of the cycle, tool gripper arm 174 picks up a tool or toolhead from tilt unit 92 in the central position and transfers it to tool storage magazine 90 in the rear position.

Tool gripper arm 174 is rigidly attached to a vertical shaft 184 (FIG. 11) which is rotatably attached to brackets 186 on base 176 by bearings 188. A horizontal bracket 190 is rotatably attached to shaft 184 by bearings 192 and is moved by a hydraulic piston and cylinder mechanisms 194 (FIG. 10) which, in its retracted position, moves arm 174 to its forward position, and which in its extended position, moves arm 174 from its forward position to its central position. The piston rod 195 of hydraulic piston and cylinder mechanism 194 is connected to bracket 190 by a pivotal connector 196. The other end of hydraulic piston and cylinder mechanism 194 is pivotally connected to a bracket 198 on base 176.

Figure 15:
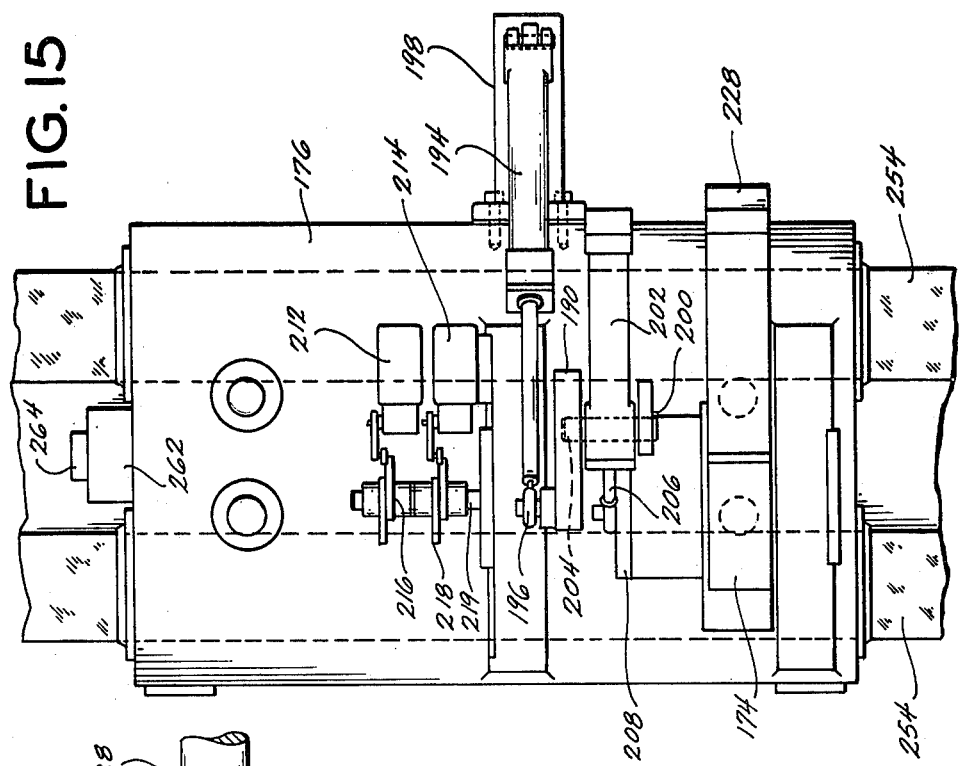
FIG. 15 is a front elevational view of the tool change arm of FIG. 10.

A bracket 200 (FIG. 11) is attached to a projection 201 of bracket 190 by machine screws 203. Bracket 200 provides a pivotal mounting for another hydraulic piston and cylinder mechanism 202 which is pivotally coupled between brackets 190 and 200 by trunnions 204 (FIG. 15). The piston rod 206 (FIG. 15) of hydraulic piston and cylinder mechanism 202 is pivotally coupled to a bracket 208 (FIG. 11) on tool gripper arm 174 by a pivotal connector 210. Hydraulic piston and cylinder mechanism 202, when extended, moves arm 174 from its central position 174B (FIG. 10) to its rear position, indicated by broken line outline 174C in FIG. 10. When hydraulic piston and cylinder mechanism 202 is retracted, it moves arm 174 from its rear position 174C to its central position, indicated by the solid line position 174B in FIG. 10. A pair of cam actuated limit switches 212 and 214 (FIGS. 11 and 15) indicate when arm 174 is in the forward, central, or rear position. Limit switch 212 is actuated by cam 216 and limit switch 214 is actuated by cam 218. Both cams 216 and 218 are mounted on a shaft 219 which is attached to shaft 184.

A semicircular gripper cavity 220 (FIG. 10) is formed in the end of arm 174. A pair of rollers 222 and a movable jaw member 224 are movably mounted in arm 174 and are positioned around gripper cavity 220 in position to grip the grooved flange of a toolholder or multiple spindle toolhead to securely hold the toolholder or toolhead in arm 174 for transfer. Movable jaw member 224 is slidable in slot 226 in arm 174 between an extended position shown in FIG. 10 and a retracted position (not shown) in which jaw member 224 is completely withdrawn into slot 226. Jaw member 224 is moved back and forth between its extended and retracted positions by a hydraulic piston and cylinder mechanism 228 which moves a slide 230 in a slot 231 (FIG. 12) crossways of jaw member 224. Slide 230 has a raised cam portion 232 (FIG. 12) which extends at a 45° angle α to the edge of slide 230 and slidably engages a cam slot 234 in jaw 224. Cam slow 234 extends at the same angle α of 45° to the edge of jaw member 224 and interacts with the raised cam portion 232 of slide 230 to move jaw member 224 between its extended and retracted position.

When hydraulic piston and cylinder mechanism 228 is extended, jaw member 224 is retracted and when hydraulic piston and cylinder mechanism 228 is retracted, as shown in FIG. 12, jaw member 224 is extended.

The tip 236 (FIG. 12) of cam portion 232 and the adjacent portion of slot 234 are angled at a small angle β to the edge of slide 230 to provide for a reduced rate of movement at the end of the retraction stroke of hydraulic piston and cylinder mechanism 228 to lock the toolholder or multiple spindle toolhead in gripper jaw cavity 220. Movement of cam portion 232 along the edge 236 will continue until jaw member 224 exerts enough pressure on the toolholder or toolhead therein to counteract the retraction force of hydraulic piston and cylinder mechanism 228.

Figure 13:
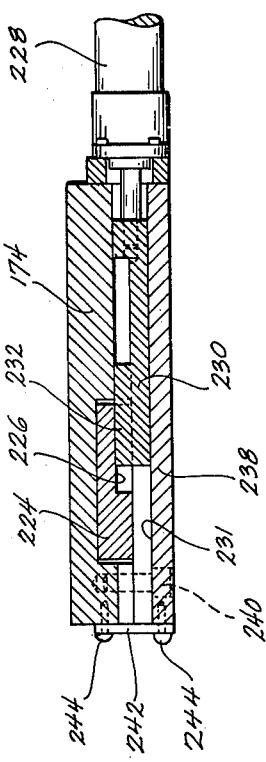
FIG. 13 is a cross sectional view taken on the line 13—13 of FIG. 11.
Figure 14:
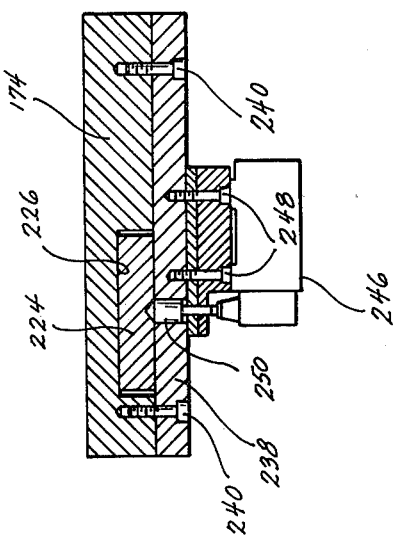
FIG. 14 is a cross sectional view taken on the line 14—14 of FIG. 11.

Referring to FIGS. 11, 13 and 14, the bottom of slot 226 in tool gripper arm 174 is closed by a cover plate 238 which is attached to gripper arm 174 by machine screws 240. The end of slot 231 is closed by a cover plate 242 (FIG. 13) which is attached to gripper arm 174 by machine screws 244. A limit switch 246 (FIGS. 11 and 14) is mounted on the bottom of cover plate 238 by machine screws 248. A spring loaded plunger 250 (FIG. 14) bears against the bottom of gripper jaw 224 and actuates switch 246 when gripper jaw 224 is in its retracted position.

Figure 16:
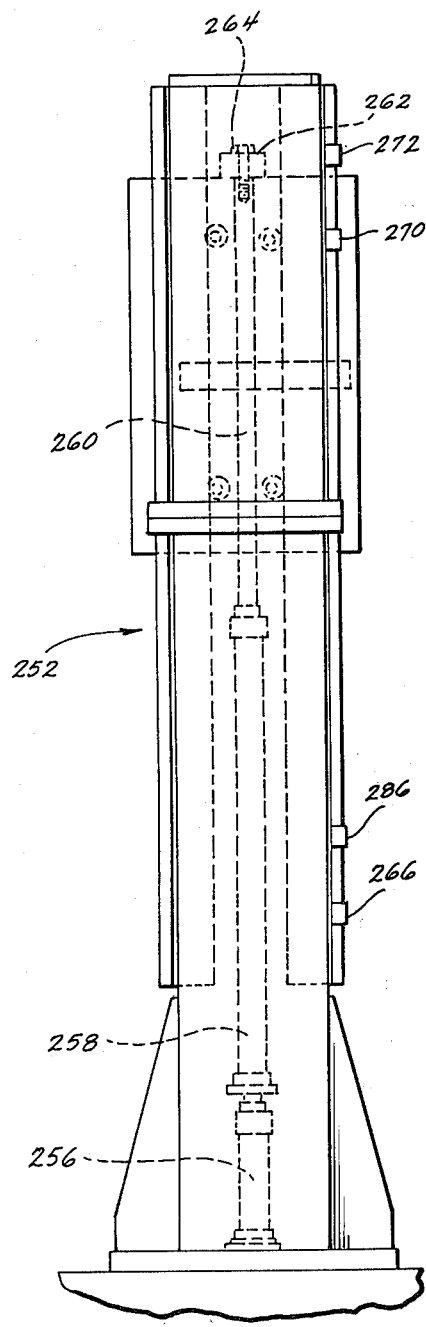
FIG. 16 is a rear elevational view of the upright which supports the tool change arm of FIG. 10.
Figure 17:
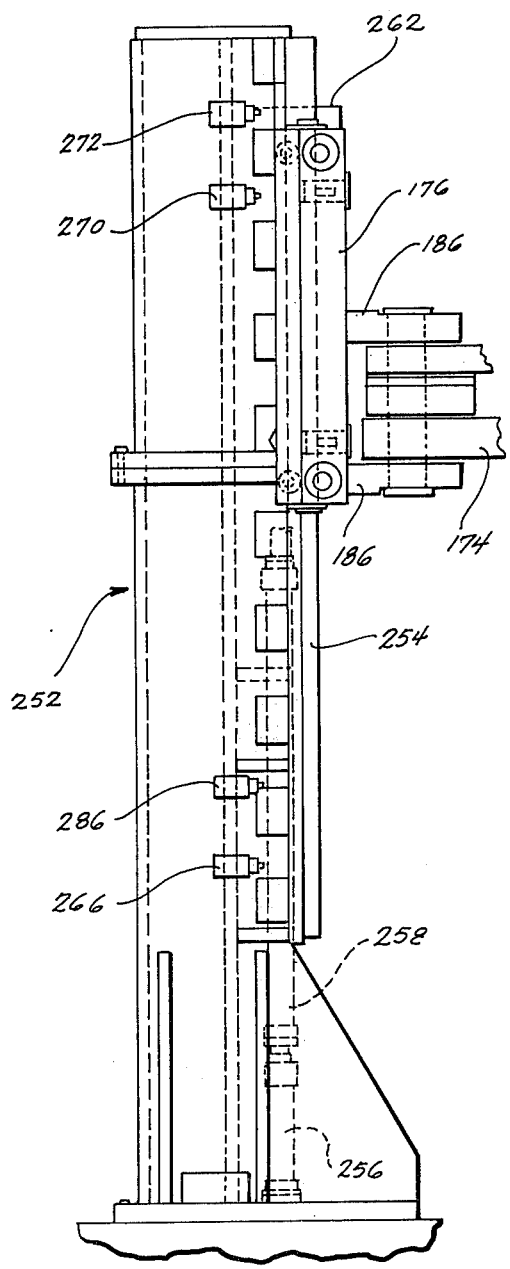
FIG. 17 is a side elevational view of the upright which supports the tool change arm of FIG. 10.

Tool gripper base 176 is slidably mounted for vertical movement on an upright 252 (FIGS. 10, 16 and 17). A set of vertical ways 254 (FIGS. 10, 15 and 17) are formed on upright 252 to guide the vertical movement of tool gripper base 176. Two vertical movements are required for base 176. The first is a short upward movement to lift a toolholder or toolhead from the tool storage socket 100 with which tool gripper arm 174 is aligned, along with the complementary short downward movement to lower a toolholder or toolhead into the tool storage socket 100. The second vertical movement is a longer upward movement to raise tool gripper arm 174 from the lower deck of tool storage magazine 90 to the upper deck thereof, along with the complementary downward movement to lower tool gripper arm 174 from the top deck to the lower deck.

These two movements are obtained by two hydraulic piston and cylinder mechanisms 256 and 258 (FIG. 16) which are connected together in tandem, the base of the longer cylinder 258 being connected to, and supported by, the end of the piston rod of the shorter piston and cylinder mechanism 256. The end of the piston rod 260 of the longer piston and cylinder mechanism 258 is attached to a bracket 262 on the top of tool gripper base 176 by a machine screw 264 (FIGS. 15 and 16). FIGS. 16 and 17 show the longer piston and cylinder mechanism 258 in its fully extended position and the shorter piston and cylinder mechanism 256 in its fully retracted position. This places tool gripper arm 174 in position to pick up a tool or toolhead from the upper deck of tool storage magazine 90. After the tool or toolhead has been gripped by gripper arm 174, it is lifted out of its socket 100 by extension of piston and cylinder mechanism 256. Then, after tool gripper arm 174 has been swung clear of tool storage magazine 90, both piston and cylinder mechanisms 256 and 258 are retracted to drop the tool or toolhead into tilt unit 92.

With both piston and cylinder mechanisms 256 and 258 retracted, tool gripper arm 174 is vertically positioned to grip a toolholder or toolhead in the lower deck of tool storage magazine 90. An extension of piston and cylinder mechanism 256 will then lift the gripped toolholder or toolhead out of its socket 100. The tool gripper arm 174 is then swung over tilt unit 92 (see FIG. 2) and piston and cylinder mechanism 256 is retracted to drop the toolholder or toolhead into tilt unit 92.

Four limit switches 266, 268, 270 and 272 (FIG. 17) are mounted on upright 252 and interact with the adjacent edge of tool gripper base 176 to indicate which of the four possible vertical positions that base 176 is in at any time.

Figure 19:
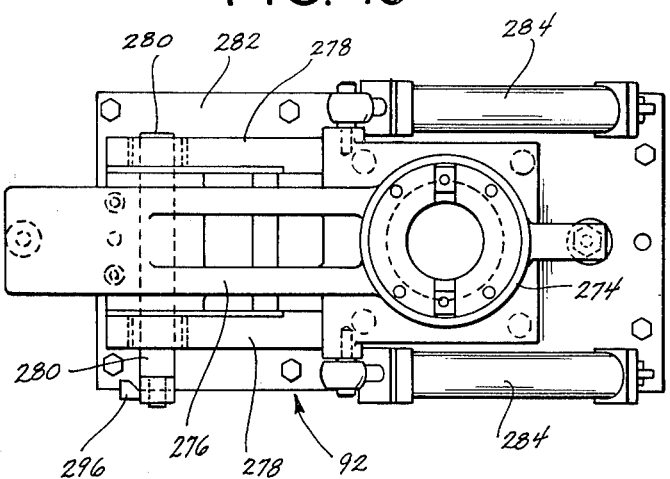
FIG. 19 is a plan view of the tilt unit.
Figure 20:
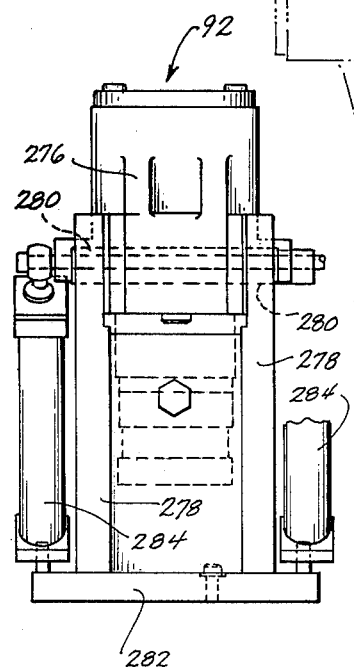
FIG. 20 is a front elevational view of the tilt unit.
Figure 18:
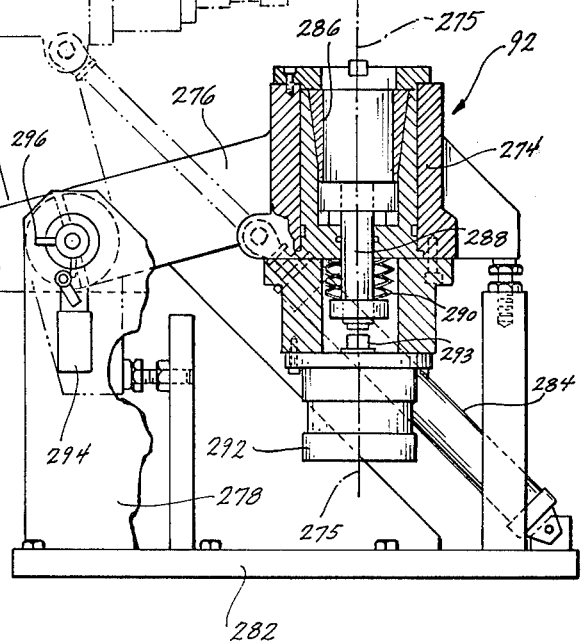
FIG. 18 is a side elevational view of the tilt unit.
Figure 22:
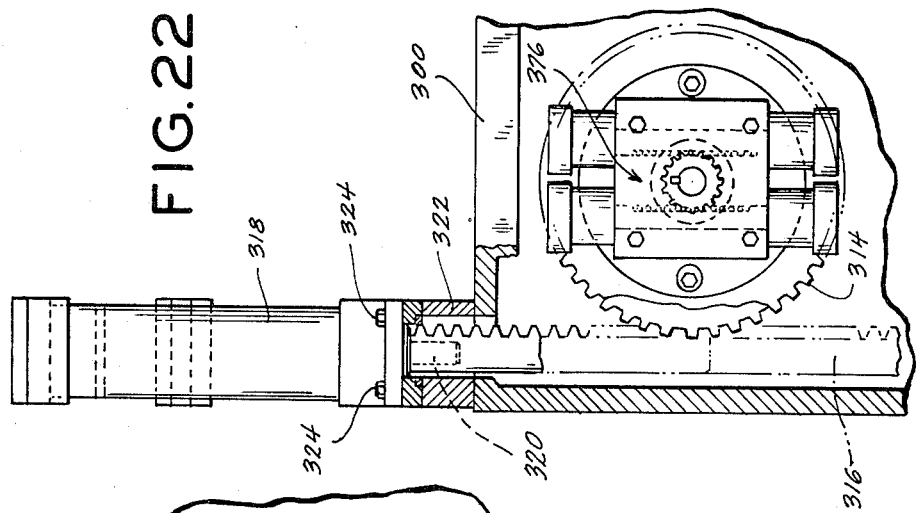
FIG. 22 is a rear elevational view taken on the line 22—22 of FIG. 21.
Figure 23:
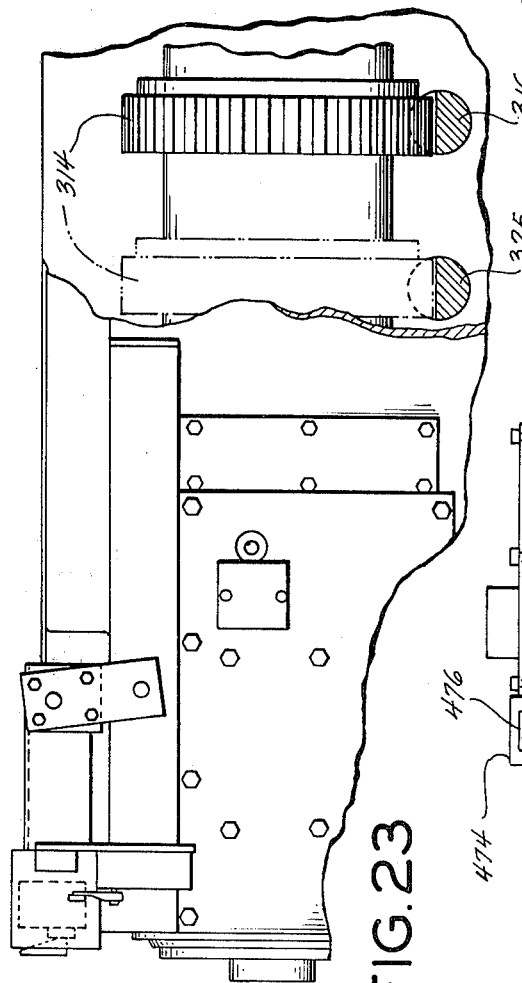
FIG. 23 is a fragmentary plan view, partially cut away, of the tool change housing adjacent to the spindle of the machining center.
Figure 24:
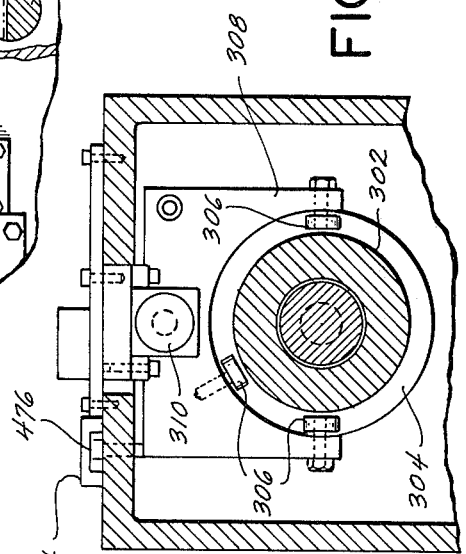
FIG. 24 is a cross sectional view taken on the line 24—24 of FIG. 21.

FIGS. 18, 19 and 20 show the details of tilt unit 92. A cylindrical tool socket 274 having an axis 275 (FIG. 18) is attached to an arm 276 which is pivotally attached to a pair of upstanding triangular sides 278 by trunnions 280. Triangular sides 278 are bolted to a base plate 282.

Socket 274 can be pivoted from a vertical position, shown in solid lines in FIG. 18, to a horizontal position, shown in broken lines in FIG. 18, by extension and retraction of two hydraulic piston and cylinder mechanisms 284 which are each pivotally connected at one end to base plate 282 and are pivotally connected at the other end to socket 274. Within socket 274, a hollow cylindrical collet clamp 286 is slidably mounted on a shaft 288. A stack of Belleville springs 290 spring bias collet clamp 286 to its clamped position. A short hydraulic piston and cylinder mechanism 292 is mounted on the bottom of socket 274 in position for its piston rod 293 to bear against the end of shaft 288 to move collet clamp 286 to its unclamped position. Collet clamp 286 serves to clamp the cylindrical shank of a toolholder or multiple spindle toolhead in socket 274.

A conventional cam operated limit switch 294 (FIG. 18) is mounted on one of the triangular sides 278 and is actuated by cam 296 to indicate whether socket 274 is in its vertical or horizontal position.

FIGS. 21 to 26 illustrate the details of the second tool change arm assembly 96 (FIG. 2) which exchanges tools or toolheads between tilt unit 92 and spindle 82. Tool change arm assembly 96 has a double ended tool gripper arm 298 which is rotatably mounted in an upright 300. Arm 298 is rigidly attached to a hollow shaft 302 (FIG. 21) which is rotatably mounted in upright 300 by conventional means (not shown) and is slidable along its axis to move arm 298 between a rear position shown in solid lines in FIG. 21 and a forward position shown in broken lines in FIG. 21.

Shaft 302 is circumferentially slotted at 304 to receive a pair of rollers 306 (FIGS. 21 and 24) which are mounted on a yoke 308. Yoke 308 is moved back and forth (right and left in FIG. 21) by a hydraulic piston and cylinder mechanism 310 whose piston rod 312 is rigidly attached to yoke 308. When piston rod 312 is extended, it moves arm 298 to the rear position shown by solid lines in FIG. 21. When piston rod 312 is retracted, it moves arm 298 to the forward position shown by broken lines in FIG. 21. The force of piston rod 312 is communicated to shaft 302 through yoke 308 and rollers 306, which allow arm 298 to rotate in either its forward or rear positions.

A spur gear 314 (FIGS. 21 and 22) is rigidly attached to the rear end of shaft 302 and engages a rack 316 (FIG. 22) when shaft 302 is in its rear position, shown by solid lines in FIG. 21. Rack 316 is moved up and down by a hydraulic piston and cylinder mechanism 318 whose piston rod 320 is attached to rack 316 and whose cylinder is attached to a bracket 322 on upright 300 by machine screws 324. The full stroke of rack 316 rotates shaft 302 through 90° to rotate arm 298 from its vertical position (shown in FIGS. 1, 21 and 25) to its horizontal position (shown in FIG. 26). The vertical position of arm 298 is the stand-by position and the horizontal position is the tool pick up or deposit position.

When shaft 302 and arm 298 are in their forward position, shown by broken lines in FIG. 21, gear 314 is aligned with a second rack 325 (FIGS. 21 and 23) which is moved by a hydraulic piston and cylinder mechanism 326. The piston rod 328 of piston and cylinder mechanism 326 is attached to rack 325, which is twice as long as rack 316 and rotates shaft 302 and arm 298 by 180° to interchange the ends thereof. The rotation through 180° only occurs when shaft 302 and arm 298 are in their forward position, shown by the broken lines in FIG. 21.

Limit switches 330 and 332 (FIG. 21) are mounted on upright 300 by conventional means and are actuated by plungers 334 and 336 to indicate whether arm 298 is in the forward or rear position. A limit switch 338 is mounted on the housing 340 for rack 325 and interacts with a plunger 342 to indicate whether arm 298 is in a position to pick up tools or toolheads or to deposit tools or toolheads.

Tool gripper arm 298 (FIGS. 25 and 26) has opposed tool gripper cavities 344 and 346 which contain rollers 348. Rollers 348 are dimensioned and positioned to fit in a standard grooved flange on a toolholder or multiple spindle toolhead. A pair of rotary tool gripper jaws 350 and 352 are rotatably attached to arm 298 adjacent to gripper cavities 344 and 346. Tool gripper jaws 350 and 352 have gripping segments 354 and 356, respectively, which are shaped to enter the grooved flange on a toolholder or multiple spindle toolhead. Gripper jaws 350 and 352 are spring biased by torsion springs 358 (FIGS. 31 and 32) to urge gripping segments 354 and 356 away from tool cavities 344 and 346, respectively. The movement of gripping segments 354 and 356 away from tool cavities 344 and 346 is limited by the abutment of the straight edges 370 and 372 of gripper jaws 350 and 352 with stop pins 362 and 364, respectively.

Figure 25:
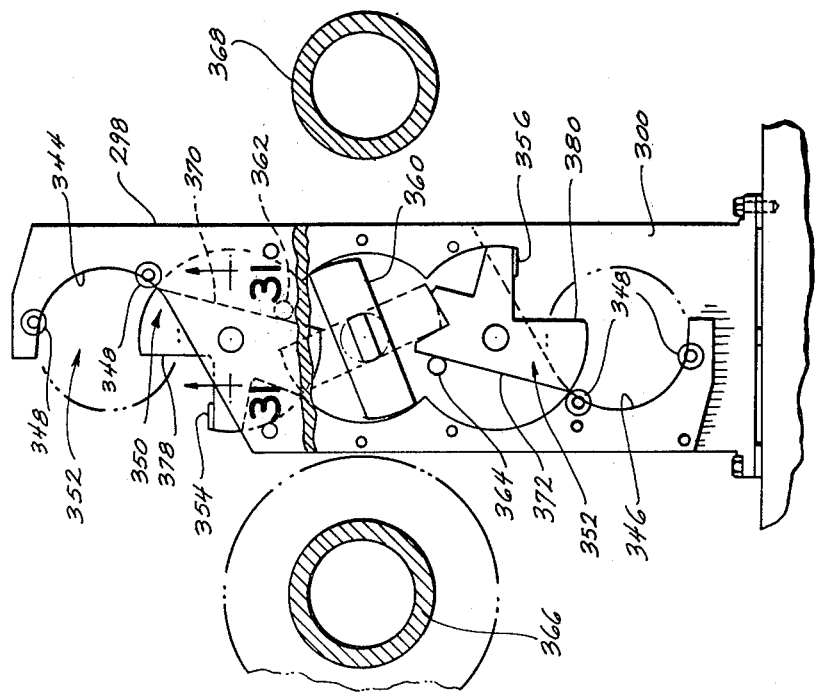
FIG. 25 is a front elevational view of the tool change arm of FIG. 21 with the front cover cut away and the arm in its vertical position.

A cam 360 with an open position shown in solid lines in FIG. 25 and a locked position shown in broken lines in FIG. 25 is rotatably mounted between gripper jaws 350 and 352. In the locked position shown in FIG. 26, both gripper jaws 350 and 352 are rotated toward their respective tool cavities 344 and 346 to insert tool grip segments 354 and 356 into the grooved flange of toolholders 366 and 368, respectively. In the position shown in FIG. 26, both tool gripper jaws 350 and 352 are locked in the position shown by cam 360, which abuts against the straight edges 370 and 372 on jaws 350 and 352, respectively. This locks toolholders 366 and 368 in tool cavities 344 and 346, respectively. Cam 360 is mounted to be able to float laterally to equalize clamping pressure. To release toolholder 366 and 368, cam 360 must be rotated 90 degrees counterclockwise from the position shown in FIG. 26 back to the position shown in solid lines in FIG. 25. This permits tool gripper jaws 350 and 352 to rotate counterclockwise in FIG. 26 away from tool cavities 344 and 346, respectively.

Figure 26:
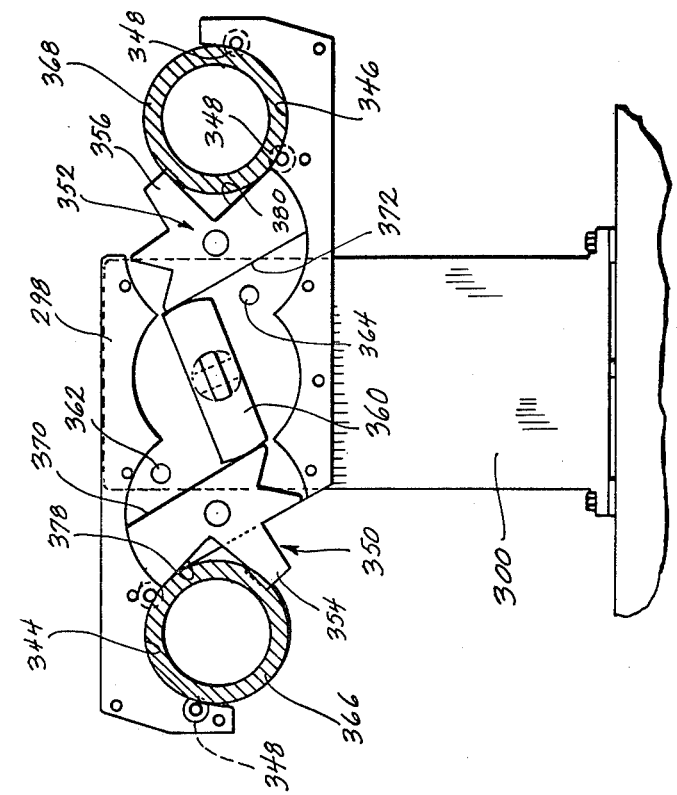
FIG. 26 is a front elevational view of the tool change arm of FIG. 21 with the front cover cut away and the arm in its horizontal position.

Referring to FIGS. 21 and 26, cam 360 is attached to a shaft 374 (FIG. 21) which extends through the hollow interior of shaft 302. The rear end of shaft 374 (on the right side of FIG. 21) is connected to a hydraulic rotary actuator 376 such as manufactured by the Flo-Tork Company, Oville, Ohio. Rotary actuator 376 acts to rotate shaft 374 by 90° clockwise or counterclockwise in response to electrical signals. 90° rotation of shaft 374 rotates cam 360 between its open and locked position as described previously.

Toolholder 366 in FIG. 25 is in spindle 82 while toolholder 368 is in tilt unit 92. To exchange toolholders 366 and 368, upright 66, saddle 52 and spindlehead 72 are moved by the N.C. axis servo systems to the positions shown in FIGS. 1 and 2. Tool change arm 298 is then rotated 90° counterclockwise from the position shown in FIGS. 1 and 25 to the position shown in FIG. 26. As tool cavities 344 and 346 approach toolholders 366 (FIG. 25) and 368, the latter contact flat edges 378 and 380 of gripper jaws 350 and 352 and cause them to rotate to move gripper segments 354 and 356 into the grooved flange of toolholders 366 and 368. Gripper segments 354 and 356 are then locked in position by rotating cam 360 by 90° counterclockwise to the position shown in FIG. 26.

To unlock gripper jaws 350 and 352, cam 360 is rotated 90° counterclockwise in FIG. 26, which releases gripper jaws 350 and 352 to rotate away from toolholders 366 and 368 under the urging of their respective torsion springs 358 (FIGS. 31 and 32).

Although the operation of tool change arm 298 has been described in connection with tools on both ends of the arm, it will work as well with a single tool at either end of the arm.

Referring to FIG. 27, spindle 82 is rotatably mounted within spindlehead 72 by bearings 384 and is driven by a conventional speed change gear set 386. Spindle 82 is hollow and contains a drawbolt 388 rotatably mounted therein and adapted to be rotated by a conventional drawbolt motor and clutch arrangement which are not shown in the drawings. Drawbolt 388 is threaded at its front end 390 to fit into a threaded opening in the cylindrical end of a toolholder or multiple spindle toolhead.

A collet clamp 392 with a cylindrical socket is attached to the front end of a hollow collet tube 394 which lies within the hollow interior of spindle 82 and encloses drawbolt 388. Collet tube 394 is axially slidable with respect to spindle 82 and drawbolt 388 and is axially shifted between an open and a clamped position of collet 392 by a hydraulic piston and cylinder mechanism 396 (on the right side of FIG. 27). The piston rod 398 of piston and cylinder mechanism 396 acts on a lever arm 400 which is pivotally connected to spindlehead 72 by pin 402 and has a cam 404 which pushes or pulls on collet tube 394 when lever arm 400 is rocked by hydraulic piston and cylinder mechanism 396. Collet clamp 392 clamps the toolholder shank or toolhead shank to spindle 82 to prevent the toolholder from being dislodged when drawbolt 388 is screwed thereinto. Collet clamp 392 also centers the toolholder shank.

A novel clamp and support means is used to clamp relatively heavy (e.g. 1,000 pounds) multiple spindle toolheads 405 (FIG. 33) to spindlehead 72 to support the toolhead 405 and hold it stationary while its shank 406 and tools 408 are rotating with spindle 82.

Toolhead 405 has a body 497 in which a plurality of spindles 498 are journaled. Spindles 498 are rotated by conventional gears 499 which are coupled between spindles 498 and shank 406, which is journaled in body 497 and flange block 503 by bearings 500. Body 497 has a backplate 501 with a central opening 502 through which shank 406 passes.

A flange block 503 is attached to backplate 501 by bolts 504 and extends rearwardly from backplate 501. Flange block 503 is cylindrical in shape and has the same outside diameter as the flange 448 (FIG. 39) of an individual toolholder which is dimensioned to be gripped by the tool changer arms 174 (FIG. 1) and 298 described previously. Flanges 448 and 503 have V-grooves 450 (FIG. 39) and 452 (FIG. 33) which have the same dimensions and are dimensioned to be gripped by the above-noted tool changer arms 174 and 298. Flange block 503 has a rear flange on the rear portion thereof for supporting toolhead 405 as described below.

Four threaded studs 410, each having two opposed flats 412 (FIGS. 36 and 38) ground on is threaded end, are rigidly attached to circumferentially spaced openings 414 in rear flange 416 (FIG. 33) of each multiple spindle toolhead 405. FIG. 38 shows a perspective view of one of the studs 410. The head 418 of stud 410 is oblong in shape and has two holes 420 for receiving machine screws 422 (not visible in FIG. 33) which rigidly fasten stud 410 to flange 416. Although only one stud 410 is visible in FIG. 33, it will be understood that the other three are positioned at circumferential positions that are not cut by the plane of FIG. 33.

A guide pin 424 (FIG. 33) which is attached by conventional means to flange 416 coacts with a guide opening 426 in spindlehead 72 to correctly align studs 410 with the threaded openings 428 (FIG. 35) into which studs 410 are inserted. Openings 428 have slotted sides 430 which receive the threaded portions of studs 410 while the flats 412 of stud 410 pass by the threaded portions of opening 428. Threaded openings 428 are each formed in a collar 432 which is rotatably attached to spindlhead 72 (FIG. 33). Each stud 410 is locked in the corresponding collar 432 by rotating collar 432 by 90° after stud 410 is inserted in opening 428. The 90° rotation of collar 432 engages the threaded portion of stud 410 with the threaded portion of opening 428.

FIGS. 34 and 37 show the means for rotating each collar 432 to lock the corresponding stud 410 therein. Collar 432 is attached to a shaft 434 (FIG. 34) which is rotatably attached to spindlehead 72 by bearings 436. A ball screw thread 438 is formed on shaft 434 and engages a ball nut 440. A hydraulic piston and cylinder mechanism 442 is coupled to ball nut 440 by conventional means and pushes or pulls ball nut 440 axially along ball screw thread 438 far enough to cause shaft 434 to rotate by 90°, thereby rotating collar 432 by 90° to effect the locking action described above. The ball screw turn-lock mechanism described above has the advantage of being slender enough in its lateral dimensions to fit in the limited space available in spindlehead 72 outside of spindle 82.

FIG. 39 shows a boring bar 444 which is adapted to be handled by the previously described automatic tool changer and to be clamped in spindle 82. The shank 446 of boring bar 444 has the same dimensions as the shank 406 of multiple spindle toolhead 405. Boring bar 444 has a flange 448 with a V-shaped groove 450 therein. Groove 450 has the same dimensions as the V-shaped groove 452 (FIG. 33) in multiple spindle toolhead 405. The only difference in using boring bar 444, or some other spindle tool, in place of multiple spindle toolhead 405 is that with a single tool it is not necessary to turn collars 432, and since coolant could get into openings 428 of collars 432 when they are not used, a circular shield 454 (FIG. 29) is rotatably attached to spindlehead 72 to normally cover openings 428 as shown in FIG. 29.

When a single tool is used, shield 454 covers openings 428, but when a multiple spindle toolhead is used, shield 454 is rotated by an angle θ to place openings 456 over openings 428 to expose them to receive studs 410 as described previously. Shield 454 is rotated by downward movement of a pin 458 on the side of shield 454 adjacent to upright 300, which supports tool change arm 298. Each time tool change arm 298 is moved to its forward position, described previously, an arm 460 which is swingably mounted on upright 300 moves to the position shown in broken lines in FIG. 29 and engages pin 458 in a slot 462 on a bracket 464. Bracket 464 is coupled to a hydraulic piston and cylinder mechanism 466. When a multiple spindle toolholder is about to be transferred into spindle 82, piston and cylinder mechanism 466 is extended to drive bracket 464 and pin 458 to the lower position shown in broken lines in FIG. 29. This exposes openings 428. When a single tool is about to be transferred into spindle 82, piston and cylinder mechanism 466 is not extended and openings 428 remain covered.

The mechanism for moving arm 460 between the two positions shown in FIG. 29 is shown in FIG. 28 and 30. Arm 460 is pivotally attached to upright 300 by a pivot pin 468. Another arm 470 is rigidly attached crossways to arm 460 and is pivotally attached to a slide 472 which is slidably mounted in a housing 474 (FIG. 28) on upright 300. Slide 472 is connected by pin 476 (FIG. 28) to yoke 308 (FIG. 24) which moves tool change arm 298 between its forward and rear positions. Every time tool change 298 is moved forwardly, pin 476 pushes slide 472 forward which causes arm 460 to rotate about pin 468 as shown in FIG. 28 and described previously.

An illustrative tool change cycle will now be described step by step beginning with the following initial conditions:

(A) A boring bar 44 (FIG. 39) is clamped in spindle 82 and is being used to machine a workpiece 86 (FIG. 2) on worktable 88.

(B) The empty tool socket 100 for boring bar 44 is at the tool transfer position in the upper deck of tool storage magazine 90 and locating stud 148 is lowered.

(C) The next tool to be used is a multiple spindle toolhead 405 (FIG. 33) which is in a socket 100 in the upper deck of tool storage magazine 90 in a known position.

(D) Tilt unit 92 is empty and is in the vertical position.

(E) Tool change arm 174 is empty and is in the central position opposite the lower deck of tool storage magazine 90.

(F) Tool change arm 298 is empty on both ends and is in the vertical rear position.

Under the foregoing initial conditions, the tool change cycle will proceed as follows:

(1) While the workpiece 86 is being machined, motor 132 (FIG. 6) of the upper deck of tool storage magazine 90 is energized in the forward direction to move tool sockets 100 past the tool transfer position shown at point 478 in FIG. 2.

(2) The number of times that a lug 140 (FIG. 7) passes over proximity switch 142 is counted by a conventional counter (not shown) until the known position of the tool socket 100 containing the desired toolhead 405 is at tool transfer point 478. If, for example, the empty tool socket 100 for the tool in use is tool socket Number 15 and the toolhead 405 to be used next is in tool socket Number 19, the desired tool will be at the tool transfer point 478 on the fourth output pulse of proximity switch 142.

(3) When the desired tool is at the tool transfer point 478, motor 132 (FIG. 6) is de-energized and coasts to a stop. This places the desired tool socket slightly past tool transfer point 478.

(4) Hydraulic piston and cylinder mechanism 150 (FIG. 7) is extended to raise locating stud 148 as shown in FIG. 7.

(5) Motor 132 (FIG. 6) is energized for slow rotation in the reverse direction to move lug 140 against locating stud 148 and locate the desired tool socket 100 at tool transfer point 478. Motor 132 is allowed to stall in the reverse direction to hold lug 140 against locating stud 148.

(6) Hydraulic piston and cylinder mechanism 258 (FIGS. 16 and 17) is extended to raise tool change arm 174 to the level of the upper deck of tool storage magazine 90.

(7) Hydraulic piston and cylinder mechanism 202 (FIG. 10) is extended to move tool change arm 174 to tool transfer point 478. This places tool cavity 220 (FIG. 10) around the V-groove of the desired toolhead 405.

(8) Hydraulic piston and cylinder mechanism 228 (FIG. 10) is retracted to move gripper jaw 224 into contact with the V-groove of toolhead 405 to clamp it to arm 174.

(9) Hydraulic piston and cylinder mechanism 256 (FIGS. 16 and 17) is extended to lift toolhead 405 out of tool socket 100.

(10) Hydraulic piston and cylinder mechanism 292 (FIG. 18) is extended to open collet clamp 286 in tilt unit 92.

(11) Hydraulic piston and cylinder mechanism 202 (FIG. 10) is retracted to swing toolhead 405 over tilt socket 274.

(12) Hydraulic piston and cylinder mechanism 256 (FIG. 16) is retracted to lower toolhead 405 into tilt socket 274 of tilt unit 92.

(13) Hydraulic piston and cylinder mechanism 228 (FIG. 10) is extended to release gripper jaw 224 from toolhead 405.

(14) Hydraulic piston and cylinder mechanism 292 (FIG. 18) is retracted to close collet clamps 28 of tilt unit 92.

(15) Hydraulic piston and cylinder mechanism 194 (FIG. 10) is retracted to swing tool change arm 174 to its forward position.

(16) Hydraulic piston and cylinder mechanisms 284 (FIGS. 18 and 19) are extended to swing tilt socket 274 and toolhead 405 to the horizontal position.

The foregoing steps 1 to 16, or any desired portion thereof, can be performed while workpiece 86 (FIG. 2) is being machined with the tool placed in spindle 82 during the preceding tool change. Step 17, however, cannot be performed until the current machining operation on workpiece 86 is completed.

(17) The X, Y and Z axes drives for the machine tool are actuated to bring spindle 82 into the tool change position shown in FIGS. 1 and 2 and spindle 82 is stopped.

(18) Hydraulic piston and cylinder mechanism 318 (FIG. 21) is extended to rotate tool change arm 298 by 90° from the vertical to the horizontal position.

(19) Hydraulic rotary actuator 376 (FIG. 21) is rotated counterclockwise 90° to lock cam 360 (FIGS. 25 and 26) against tool grip jaws 350 and 352.

(20) Piston and cylinder mechanism 398 (FIG. 27) is extended to open collet clamp 392 in spindle 82.

(21) Piston and cylinder mechanism 292 (FIG. 18) is extended to open collet clamp 286 in tilt unit 92.

(22) Piston and cylinder mechanism 310 (FIG. 21) is retracted to pull tool 444 out of spingle 82 and toolhead 405 out of tilt socket 274.

(23) Piston and cylinder mechanism 326 (FIG. 21) is extended to rotate tool change arm 298 by 180° to interchange tool 444 and toolhead 405.

(24) Piston and cylinder mechanism 466 (FIG. 29) is extended to move openings 456 over lock openings 428.

(25) Piston and cylinder mechanism 310 (FIG. 21) is extended to insert toolhead 405 into spindle 82 and tool 444 into tilt socket 274.

(26) Piston and cylinder mechanisms 442 (FIG. 34) are extended to rotate locking collars 432 by 90° to lock studs 410 therein.

(27) Hydraulic rotary actuator 376 (FIG. 21) is rotated clockwise 90° to unlock cam 360 (FIGS. 25 and 26) from tool grip jaws 350 and 352.

(28) Piston and cylinder mechanism 398 (FIG. 27) is retracted to close collet clamp 392 is spindle 82.

(29) Hydraulic piston and cylinder mechanism 292 (FIG. 18) is retracted to close collet clamp 286 in tilt unit 92.

(30) Piston and cylinder mechanism 318 (FIG. 21) is retracted to rotate tool change arm 298 from the horizontal to the vertical position. After this step, machining of the workpiece can begin again with the new tool.

(31) Piston and cylinder mechanisms 284 (FIG. 18) are retracted to tilt boring bar 444 and tilt socket 274 to the vertical position.

(32) Piston and cylinder mechanism 194 (FIG. 10) is extended to swing tool change arm 174 over tilt socket 274.

(33) Piston and cylinder mechanism 228 (FIG. 10) is retracted to move gripper jaw 224 into contact with boring bar 444.

(34) Hydraulic piston and cylinder mechanism 292 (FIG. 18) is extended to open collet clamp 286 in tilt unit 92.

(35) Piston and cylinder mechanisms 256 and 258 (FIGS. 16 and 17) are both extended to raise boring bar 444 above the level of the upper deck of tool storage magazine 90.

(36) Piston and cylinder mechanism 202 (FIG. 10) is extended to move boring bar 444 to exchange position 478.

(37) Piston and cylinder mechanism 256 (FIGS. 16 and 17) is retracted to drop boring bar 444 into tool socket 100.

(38) Piston and cylinder mechanism 228 (FIG. 10) is extended to move gripper jaw 224 out of contact with boring bar 444.

(39) Piston and cylinder mechanism 202 (FIG. 10) is retracted to move tool change arm 174 to its central position.

This completes the tool change cycle for the particular tools involved.

Figure 40:
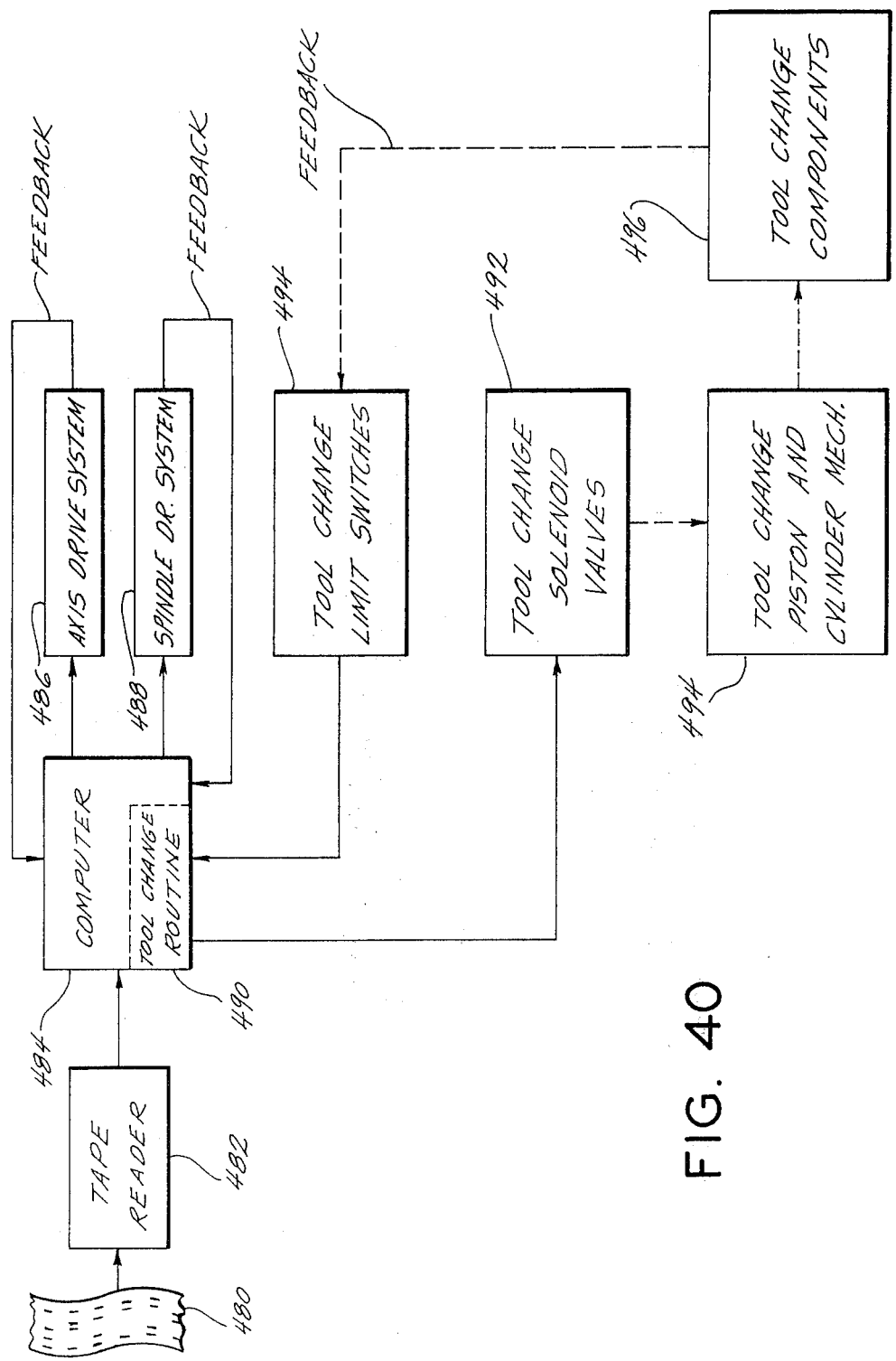
FIG. 40 is a block diagram of the electrical circuits which control the machine tool and automatic tool changer of this invention.

FIG. 40 is a block diagram of the electrical circuits which control the operation of the machine tool. Standard coded instruction signals are punched on a punched tape 480 and include signals indicating which tools to use, when the tools should be changed, and detailed speed and positioning instructions for spindle 82 to perform the desired machining operations, along with any other functions (such as coolant flow) which are necessary for the operation of the machine tool. The instruction signals are read off tape 480 by a tape reader 482 and are applied to a computer 484 which controls the operation of the machine tool through a conventional three axes drive system 486, a conventional spindle drive system 488 and other conventional machine tool circuits (not shown) which do not interact with the automatic tool changer of this invention.

The foregoing tool change sequence is controlled by a suitable tool change computer routine 490 in computer 484 which controls the sequential actuation of tool change solenoid valves 492 to actuate the tool change piston and cylinder mechanisms 494 in the above described sequence. Although solenoid valves 492 are not shown individually, it will be understood by those skilled in the art that one solenoid valve is included in the circuit for each of the piston and cylinder mechanisms described herein and illustrated in FIGS. 1 to 39. Each piston and cylinder mechanism is either extended or retracted in accordance with the state of the corresponding solenoid valve. The state of all of the solenoid valves 492 at any given time is controlled by tool change routine 490 in accordance with well known prior art programming practice to achieve the sequence of actuation described above in tool change steps 1 to 39.

Tool change limit switches 494 are coupled to tool change components 496 in accordance with well known prior art electrical control practice to indicate when the desired movement of a tool change component has been completed. The electrical control portions of the machine tool are entirely conventional with the exception of the actuation sequence described above in tool change steps 1 to 39. Accordingly, the details of the electrical control circuits are not described herein.

Although the illustrative embodiment of the invention has been described in considerable detail for the purpose of fully disclosing a practical operative structure incorporating the invention, it is to be understood that the particular apparatus shown and described in intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. A multiple spindle toolhead having a housing and adapted to be removably mounted on a machine tool in position to be driven by the conventional spindle in the spindlehead of the machine tool;

at least one spindle journaled in said housing and extending forwardly therefrom for receiving a cutting tool to perform a machining operation;

drive means in said housing connected to transmit power for rotating said toolhead spindles;

coupling means extending from said housing for coupling said drive means to the machine tool spindle so that rotation of the spindle actuates said drive means for rotating said toolhead spindles;

a flange block coaxially secured to said housing and extending rearwardly therefrom to present an exposed face for engagement with the surface of the spindlehead;

means on said flange block for engagement by the grips of a tool transfer mechanism to enable the toolhead to be transferred by a tool change mechanism;

a plurality of studs rigidly secured to said flange block to extend rearwardly therefrom, said studs being spaced from each other in conformance with the spacing of rotary nuts mounted on the spindlhead about the periphery of the spindle;

a pair of diametrically opposed flats formed on the end of each of said studs to produce diametrically opposed arcuate portions between said flats to enable said studs to enter an opening of like shape formed in each of said nuts;

threads formed on said arcuate portions for engagement with the threads formed in the nuts so that after the studs are moved into the respective openings in said nuts a partial turn of the nuts will engage the cooperating threads on the studs to draw the exposed face of said flange block tightly against the surface of the spindlehead frame to firmly support the toolhead in operating position;

and guide means on said flange block adapted to engage complementary guide means on the machine tool for accurately orientating the toolhead as it is being moved toward the machine tool spindle to insure alignment of the studs on the toolhead with the cooperating nuts on the machine tool.

2. A multiple spindle toolhead according to claim 1 wherein said coupling means comprises a shank that corresponds in shape and size to the shank of the conventional cutting tools used in the machine tool spindle, and including means on said shank for engagement by the tool locking mechanism to securely seat and lock the shank in the machine tool spindle.

* * * * *